(12) United States Patent
Li et al.

(10) Patent No.: US 11,512,379 B2
(45) Date of Patent: Nov. 29, 2022

(54) POST DEPOSITION HEAT TREATMENT OF BOND COAT AND ADDITIONAL LAYERS ON CERAMIC OR CMC SUBSTRATE

(71) Applicant: Rolls-Royce Corporation, Indianapolis, IN (US)

(72) Inventors: Li Li, Indianapolis, IN (US); Taylor K. Blair, Indianapolis, IN (US); Stephanie Gong, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/360,375

(22) Filed: Jun. 28, 2021

(65) Prior Publication Data
US 2022/0002857 A1    Jan. 6, 2022

Related U.S. Application Data

(60) Provisional application No. 63/046,939, filed on Jul. 1, 2020.

(51) Int. Cl.
*C23C 4/18* (2006.01)
*C23C 4/02* (2006.01)

(52) U.S. Cl.
CPC . *C23C 4/18* (2013.01); *C23C 4/02* (2013.01)

(58) Field of Classification Search
CPC .................................. C23C 4/18; C23C 4/02
See application file for complete search history.

(56) References Cited

U.S. PATENT DOCUMENTS

| | | | |
|---|---|---|---|
| 4,127,416 | A | 11/1978 | Lumby et al. |
| 4,474,614 | A | 10/1984 | Arentzen |
| 5,362,341 | A | 11/1994 | Palmer |
| 5,391,404 | A | 2/1995 | Lee et al. |
| 5,496,644 | A | 3/1996 | Lee et al. |
| 5,869,146 | A | 2/1999 | McCluskey et al. |

(Continued)

FOREIGN PATENT DOCUMENTS

| | | |
|---|---|---|
| EP | 1626039 A2 | 2/2006 |
| EP | 3178799 A1 | 6/2017 |

(Continued)

OTHER PUBLICATIONS

Final Office Action from U.S. Appl. No. 16/884,841, dated Feb. 8, 2022, 12 pp.

(Continued)

*Primary Examiner* — Nathan T Leong
(74) *Attorney, Agent, or Firm* — Shumaker & Sieffert, P.A.

(57) ABSTRACT

In one example, a method for forming a coating system including a bond coat and an environmental barrier coating on a ceramic or CMC substrate, e.g., with an abradable coating on the environmental barrier coating. The method may include depositing a bond coat on a ceramic or ceramic matrix composite (CMC) substrate to form an as-deposited bond coat; heat treating the as-deposited bond coat following the deposition of the as-deposited bond coat on the substrate to form a heat treated bond coat; depositing an environment barrier coating (EBC) layer on the heat treated bond coat to form as deposited EBC layer; and heat treating the as-deposited EBC layer to form a heat treated EBC layer.

18 Claims, 14 Drawing Sheets

(56) References Cited

U.S. PATENT DOCUMENTS

| | | | |
|---|---|---|---|
| 6,254,935 | B1 | 7/2001 | Eaton et al. |
| 6,284,325 | B1 | 9/2001 | Eaton, Jr. et al. |
| 6,299,988 | B1 | 10/2001 | Wang et al. |
| 6,787,195 | B2 | 9/2004 | Wang et al. |
| 7,595,114 | B2 | 9/2009 | Meschter et al. |
| 8,356,482 | B2 | 1/2013 | Duval et al. |
| 9,347,302 | B2 | 5/2016 | Kaminksy |
| 9,527,109 | B2 | 12/2016 | Margolies et al. |
| 2004/0151840 | A1 | 8/2004 | Wang et al. |
| 2005/0013993 | A1 | 1/2005 | Li et al. |
| 2005/0238888 | A1 | 10/2005 | Spitsberg et al. |
| 2011/0027578 | A1* | 2/2011 | Kirby .................. C04B 41/52 524/556 |
| 2011/0033630 | A1 | 2/2011 | Naik et al. |
| 2014/0363684 | A1 | 12/2014 | Margolies et al. |
| 2016/0003063 | A1 | 1/2016 | Rosenzweig et al. |
| 2016/0305004 | A1* | 10/2016 | Olson ..................... C23C 4/134 |
| 2016/0312628 | A1 | 10/2016 | Kirby |
| 2018/0347049 | A1 | 12/2018 | Oboodi et al. |
| 2018/0371600 | A1* | 12/2018 | Li ......................... F01D 25/005 |
| 2019/0032504 | A1 | 1/2019 | Shi et al. |
| 2020/0148544 | A1 | 5/2020 | Sato et al. |
| 2020/0277694 | A1 | 9/2020 | Bolcavage et al. |
| 2020/0377990 | A1 | 12/2020 | Li et al. |
| 2021/0017090 | A1 | 1/2021 | Shi et al. |
| 2021/0276925 | A1 | 9/2021 | Shi et al. |
| 2022/0002857 | A1 | 1/2022 | Li et al. |

FOREIGN PATENT DOCUMENTS

| | | |
|---|---|---|
| EP | 3434803 A1 | 1/2019 |
| EP | 3702344 A1 | 9/2020 |
| WO | 2015126476 A2 | 8/2015 |
| WO | 2018186308 A1 | 10/2018 |

OTHER PUBLICATIONS

Zhong et al., "Microstructure Evolution and Therinomechanical Properties of Plasma-Sprayed Yb2Si05 Coating During Thermal Aging," Journal of the American Ceramic Society, vol. 100, No. 5, May 2017, pp. 1896-1906.

Lee et al., "New Generation of Plasma-Sprayed Mullite Coatings on Silicon Carbide," Journal of the American Ceramic Society, vol. 78, No. 3, Apr. 1995, pp. 705-710.

Lee et al., "Refractory Oxide Coatings in SiC Ceramics," NASA Technical Memorandum 106677, Aug. 1994, 41 pp.

Richards et al., "Response of Ytterbium Disilicate-silicon Environmental Barrier Coatings to Thermal Cycling in Water Vapor," Acta Materialia, vol. 106, Jan. 8, 2016, 14 pp.

Shneidman et al., "The Fast Cooling/Heating Rate Effects in Devitrification of Glasses. II. Crystallization Kinetics," Journal of Chemical Physics, vol. 109, No. 1, Jul. 1, 1998, pp. 186-195.

Sujidkul et al., "Correlating Electrical Resistance Change with Mechanical Damage in Woven SiC/SiC Composites: Experiment and Modeling," Journal of the American Ceramic Society, vol. 97, No. 9, Sep. 2014, pp. 2936-2942.

Uhlmann et al., "Nucleation, Crystallization and Glass Formation," Journal of Non-Crystalline Solids vol. 38 & 39, May-Jun. 1980, pp. 693-698.

Wada et al., "Mass Transfer in Polycrystalline Ytterbium Disilicate Under Oxygen Potential Gradients at High Temperatures," Acta Materialia, vol. 135, Jun. 2017, pp. 372-381.

Garcia et al., "Phase and Microstructure Evolution in Plasma Sprayed Yb2Si2O7 Coatings," Journal of the European Ceramic Society, vol. 39, No. 4, Apr. 2019, pp. 1477-1486.

Reed, "Solid-State Sintering," Principles of Ceramics Processing 2nd ed, 1995 (Applicant points out, in accordance with MPEP 609.04(a), that the year of publication, 1995, is sufficiently earlier than the effective U.S. filing date, so that the particular month of publication is not in issue.), pp. 594-605.

Office Action from U.S. Appl. No. 16/884,841, dated Sep. 20, 2021, 15 pp.

Extended Search Report from counterpart European Application No. 21182838.9 dated Nov. 29, 2021, 9 pp.

Amendment in Response to Office Action dated Sep. 20, 2021, from U.S. Appl. No. 16/884,841, filed Dec. 20, 2021, 8 pp.

Response to Extended Search Report dated Nov. 29, 2021, from counterpart European Application No. 21182838.9 filed Jun. 21, 2022, 92 pp.

Advisory Action from U.S. Appl. No. 16/884,841, dated Apr. 15, 2022, 3 pp.

Response to Final Office Action dated Feb. 8, 2022, and the Advisory Action dated Apr. 15, 2022, from U.S. Appl. No. 16/884,841, filed May 9, 2022, 10 pp.

Response to Final Office Action dated Feb. 8, 2022, from U.S. Appl. No. 16/884,841, filed Apr. 7, 2022, 9 pp.

Office Action from U.S. Appl. No. 16/884,841 dated Aug. 1, 2022, 16 pp.

\* cited by examiner

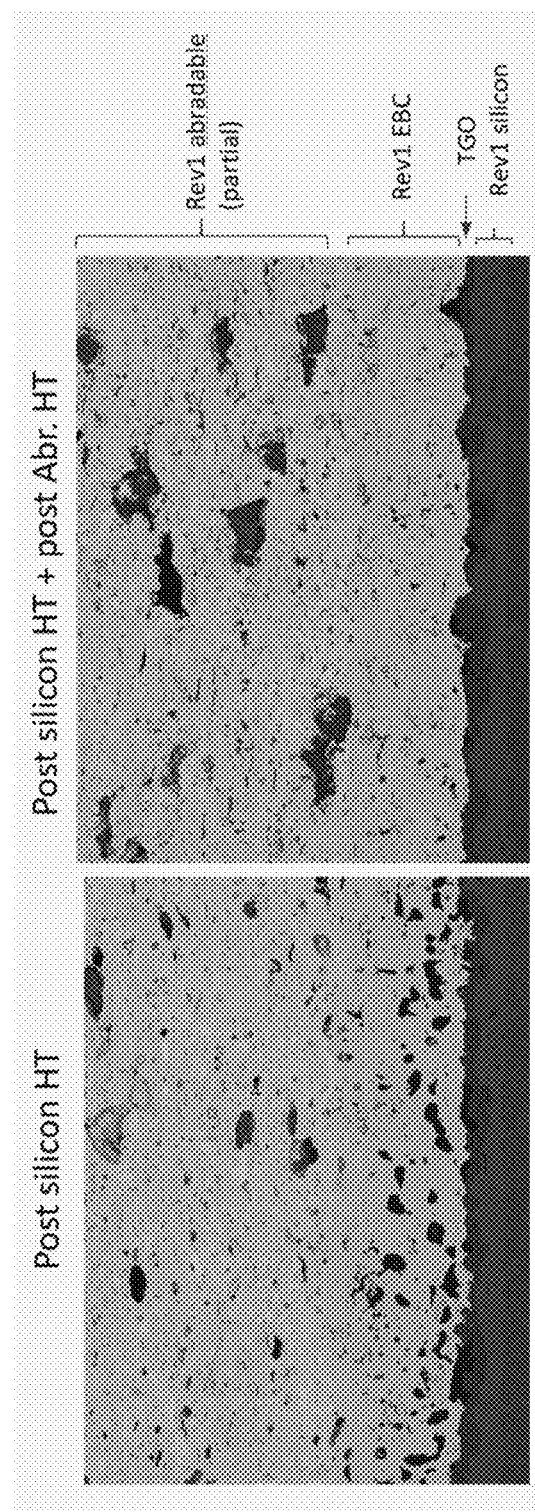
FIG. 12A
FIG. 12B
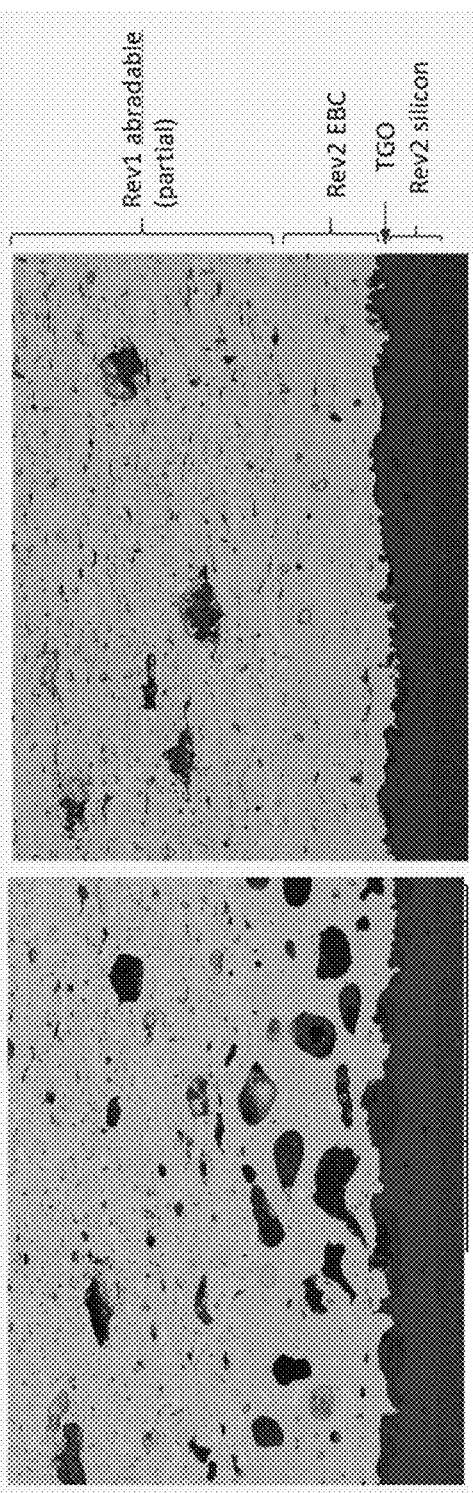
FIG. 13A
FIG. 13B

POST DEPOSITION HEAT TREATMENT OF BOND COAT AND ADDITIONAL LAYERS ON CERAMIC OR CMC SUBSTRATE This application claims the benefit of U.S. Provisional Application Ser. No. 63/046,939, entitled "POST DEPOSITION HEAT TREATMENT OF BOND COAT AND ADDITIONAL LAYERS ON CERAMIC OR CMC SUBSTRATE", filed on Jul. 1, 2020, the entire content of which is incorporated herein by reference.

TECHNICAL FIELD

The disclosure relates to techniques for forming coatings on ceramic or ceramic matrix composite substrates.

BACKGROUND

Ceramic or ceramic matrix composite (CMC) materials may be useful in a variety of contexts where mechanical and thermal properties are important. For example, components of high temperature mechanical systems, such as gas turbine engines, may be made from ceramic or CMC materials. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and reduce mechanical properties of the ceramic or CMC material, which may reduce the useful lifetime of the component. Thus, in some examples, a ceramic or CMC material may be coated with an environmental barrier coating (EBC), which may reduce exposure of the substrate to elements and compounds present in the operating environment of high temperature mechanical systems. The ceramic or CMC material may also be coated with an abradable coating on the EBC, e.g., to provide a seal between an adjacent component such as a blade tip or rotating knife during operation of the high temperature mechanical system.

SUMMARY

In some examples, the disclosure relates to coating systems including a bond coat and one or more additional layers on the bond coat (e.g., an environmental barrier coating (EBC) and/or abradable coating) on a substrate, e.g., for use in high-temperature mechanical systems, and techniques for forming the coating systems. In some examples, the techniques may include depositing and heat treating the bond coat on the substrate prior to deposition of EBC and/or abradable coating on the heat treated bond coat. The heat treatment of the bond coat may increase the adhesion of the bond coat to the underlying substrate, and may allow for a relatively thick coating system (e.g., including the combination of the bond coat and EBC and/or abradable coating).

One or more additional heat treatments may be performed on the additional layer(s) deposited on the bond layer after the bond layer has been heat treated to provide for an overall coating system with desired properties. In some examples, the EBC and/or abradable layers may also be heat treated after being deposited, e.g., in a sequential manner or all the layers being heat treated at the same time after being deposited. The one or more post deposition heat treatments may be configured to provide for an increase in interfacial strength between the respective layers in the coating system as well as provide for a desired microstructure within each layer in the coating system. In some examples, the heat treatments of the EBC and/or abradable coatings may increase a density and/or reduce a void volume (e.g., porosity) of the coating(s), stabilize phases within the coating(s), and/or transform at least a portion of amorphous phase material within the coating(s) to crystalline phase material. In cases in which the abradable coating is heat treated after depositing the abradable coating on a heat treated EBC, the conditions of the heat treatment of the EBC may be different than the conditions for the heat treatment of the abradable coating.

In some examples, the disclosure describes a method comprising depositing a bond coat on a ceramic or ceramic matrix composite (CMC) substrate to form an as-deposited bond coat; heat treating the as-deposited bond coat following the deposition of the as-deposited bond coat on the substrate to form a heat treated bond coat; depositing an environment barrier coating (EBC) layer on the heat treated bond coat to form as deposited EBC layer; and heat treating the as-deposited EBC layer to form a heat treated EBC layer In some examples, the disclosure describes a system comprising a deposition device; a heat treatment device; and a controller device configured to control the deposition device to deposit a bond coat on a ceramic or ceramic matrix composite (CMC) substrate to form an as-deposited bond coat, control the heat treatment device to heat treat the as-deposited bond coat following the deposition of the as-deposited bond coat on the substrate to form a heat treated bond coat, control the deposition device to subsequently deposit an environmental barrier coating (EBC) on the heat treated bond coat to form an as-deposited EBC, and control the heat treatment device to heat treat the as-deposited EBC form a heat treated EBC.

The details of one or more examples are set forth in the accompanying drawings and the description below. Other features, objects, and advantages will be apparent from the description and drawings, and from the claims.

BRIEF DESCRIPTION OF DRAWINGS

FIGS. 8A-17 are various example images and plots related to example experimental results relative to some aspects of the disclosure.

DETAILED DESCRIPTION

Figure 1:
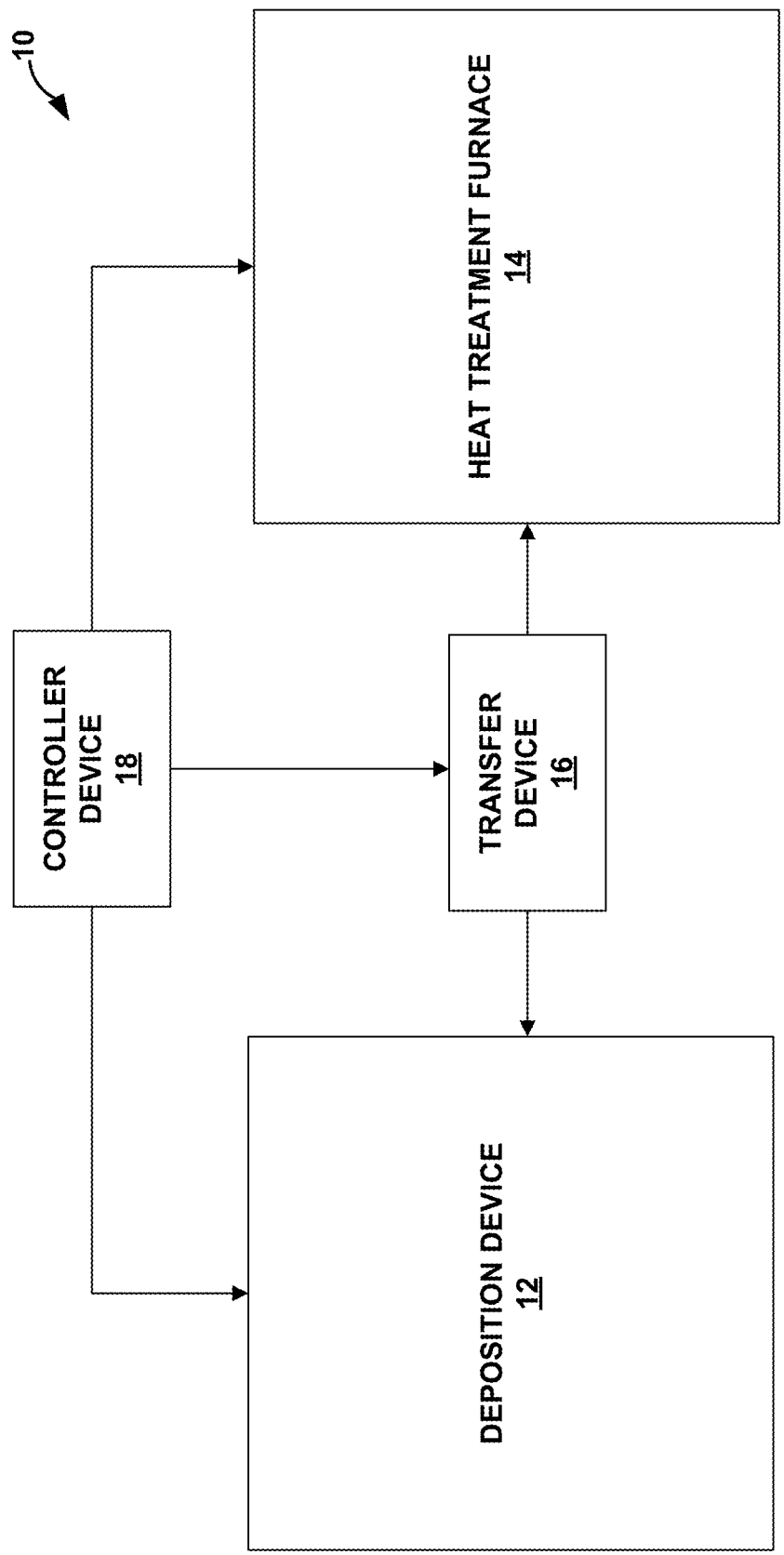
FIG. 1 is a conceptual and schematic diagram illustrating an example system for forming a coating on a substrate in accordance with an example of the disclosure.

The disclosure describes systems and techniques for forming and heating treating a coating system on a ceramic or CMC substrate. The coating system may include a bond coat formed on the substrate and one or more additional layers on the bond coat (e.g., in the form of an EBC and/or abradable coating). The coating system may be deposited using, e.g., thermal spray deposition, such as air plasma spraying, slurry deposition, or other suitable technique. The coating system may be deposited on the substrate that serves as components of gas turbine engines or other high temperature mechanical systems.

A component of a high temperature mechanical system may include a coating system having one or both of an EBC and an abradable coating on substrate, e.g., where the EBC is formed on the substrate and an optional abradable coating is formed on the EBC. The EBC may reduce exposure of an underlying substrate and/or bond coat to elements and compounds present in the operating environment of high temperature mechanical systems, such as water vapor or oxygen. The abradable coating may be configured to be abraded during the operation of a component in a high temperature mechanical system, e.g., to reduce clearance between a rotating component, such as a gas turbine blade, and a surrounding stationary component, such as blade track or blade shroud. For example, the abradable coating may be formed on a blade track or blade shroud and may be abraded as results of contact by the tip of a rotating turbine blade. As another example, the abradable coating may be formed on a runner of a knife seal and may be abraded as results of contact by the tip of a rotating knife of a knife seal. As the rotating component rotates, the tip of the rotating component contacts the abradable coating and wears away a portion of the abradable coating to form a groove in the abradable coating corresponding to the path of the rotating component tip. The intimate fit between the tip of the rotating component and abradable coating provides a seal that can reduce the clearance gap between the rotating component and an inner wall of the stationary component, which can reduce leakage around a tip of the rotating part to enhance the power and efficiency of the gas turbine engine.

A functional EBC (e.g., a layer or series of layers that function to provide environmental protection to an article) may require good bonding with ceramic or CMC substrates, such as oxide-oxide (ox-ox) or SiC-based ceramic substrates, e.g. a CMC, reaction bonded (RB) SiC, or the like. Improper surface preparation of such substrates prior to formation of the coating system on the substrate may result in poor bonding between the coating system and underlying substrate (especially relatively thick coatings), which may lead to coating delamination either post process or during service of the coated component, e.g., in a high temperature environment. Additionally, employing a single heat treatment only once all the layers of a coating system have been deposited may result in undesirable results, e.g., in terms of coating microstructure, density, porosity, phase stability, bonding between the coating system and substrate, and/or bonding between respective layers in in the coating system.

As will be described below, in some aspects, the present disclosure describes techniques that may improve EBCs, especially relatively thick EBCs, and other coating systems e.g., by increasing the bonding strength with ceramic or CMC substrates such as ox-ox or SiC based ceramic substrates. In some examples, a coating system may include a bond coat formed on the surface of a ceramic or CMC substrate. Following the formation of the as-deposited bond coat and prior to deposition of additional overlaying layers, a heat treatment may be performed on the as-deposited bond coat. The heat treatment of the as-deposited bond coat may be configured to increase the adhesion of the bond coat to the underlying substrate. For example, the heating rate, heat treatment temperature, heat treatment duration, and/or cooling rate of the heat treatment may be selected to increase the adhesion of the bond coat to the substrate, e.g., as compared to a bond coat that is not heat treated after being deposited.

While not being bound by theory, the heat treatment of the bond coat may increase the adhesion to substrate by promoting or otherwise causing diffusion bonding and/or chemical bonding between the bond coat and substrate. For example, the strong bonding may be established by either silicon diffusion and/or chemically forming silicon oxides by silicon chemically react with oxygen. Comparatively, in some example in which a bond coat is not heat treated after being formed on a substrate, the bond coat may be attached to the substrate primarily based on the mechanical attachment between the substrate and bond coat. Such mechanical attachment may be increased by preparation of the substrate surface prior to bond coat deposition (e.g., by mechanically roughening the surface of the substrate). In some examples, by heat treating the as-deposited bond coat following the formation of the bond coat on the substrate, suitable attachment of the bond coat may be achieved without mechanical roughening of the substrate surface or with a lesser degree of mechanically surface roughening during the substrate surface preparation.

Following the heat treatment of the bond coat, one or more additional coating layers may be deposited on the heat-treated bond coat. The one or more additional layers may be EBC layers and/or abradable layers.

One or more additional heat treatments may be performed on the additional layers. For example, a single additional heat treatment may be performed after all the of the additional layers have been deposited on the bond coat. As another example, multiple additional heat treatments may be performed (e.g., with one heat treatment following the deposition of some or all of the EBC layer(s) and another heat treatment following the deposition of some or all of the abradable layer(s)). The coating system on the substrate may be a relatively thick (e.g., at least about 40 mils) coating system that may allow for operation in a high temperature environment without delamination of the coating system (e.g., either from the substrate or between individual coating layers) as a results of the heat treatments carried out on the bond coat and additional layers.

In some examples, the heat treatment(s) performed on the additional layer(s) may be configured to increase the density of the heat-treated additional layer(s), e.g., as compared to the density of the as-deposited additional layer(s).

Additionally, or alternatively, the heat treatment may be configured to decrease the porosity (or other void volume) of the heat-treated additional layer(s), e.g., as compared to the porosity of the as-deposited additional layer(s).

Additionally, or alternatively, the heat treatment may be configured to maintain or modify the microstructure of the as-deposited additional layer(s), e.g., by locking in the microstructure of the as-deposited layer(s) to substantially maintain the density and/or porosity of the as-deposited layer(s).

Additionally, or alternatively, the heat treatment may be configured to stabilize the phases the as-deposited additional layer(s), e.g., by transforming at least a portion of the amorphous phase material in the as-deposited additional layer(s) to crystalline phase. The transition may be carried out in a controlled manner using the heat treatment as compared to the uncontrolled transition during high-temperature operation of coated component during operation of the high temperature mechanical system.

The heat treatments may be performed in a sequential manner with the deposition of the bond coat and additional layers, e.g., so that the respective heat treatments may be tailored to provide the desired result on each layer in cases in which the same heat treatment parameters (e.g., heating rate, heat treatment temperature, heat treatment duration, and/or cooling rate) would not provide the desired result for all the layers on the substrate.

In some examples, the disclosure relates to a SiC-based CMC component coated with a bond coat and a series of EBC layers that are deposited by a plasma spray, slurry based and/or vapor deposition process. The bond coat may comprise of silicon, a metal silicide, RE monosilicate, RE disilicate, hafnium silicate, mullite, SiC, a metal oxide or a mixture thereof and the series of EBC layers may comprise of a rare-earth (RE) monosilicate, RE disilicate or a mixture thereof with various microstructures of different porosity and cracking network.

In some examples, the post bond coat deposition heat treatment may be performed in air, oxygen, water vapor, inert gas, vacuum or combinations thereof. The heat treatment may be implemented at a heating rate of, e.g., about 0.5° C./min to about 30° C./min. The heat treatment temperature may be about 500° C. to about 1400° C. with a total time duration of about 0.1 to about 100 hours. Other example heating rates, heat treatment temperatures, and time durations are contemplated.

As described herein, in addition to the bond coat heat treatment, one or a series of post additional layer deposition heat treatments may be performed (e.g., from a single heat treatment to x heat treatments, where x is the number of additional layers on the bond coat). For example, in an instance in which the additional layers on the bond coat include a first EBC layer, a second EBC layer, and a third EBC layer, in that order, there may be a single additional heat treatment after the first EBC layer is deposited, after the second EBC layer is deposited, or after the third EBC layer is deposited. Alternatively, there may be two heat treatments, e.g., one after the first EBC layer is deposited and another after the third heat treatment is deposited or one after the first and second EBC layer is deposited and another after the third EBC layer is deposited. Alternatively, there may be three additional heat treatments, with a respective heat treatment after the deposition of each of the first, second, and third EBC layers.

In some examples, the additional heat treatments may be configured to increase (e.g., optimize or maximize) interfacial strength between the respective coating layers as well as provide the desired microstructures for each respective layer. The heat treatments may be carried out for different purposes. For example, one heat treatment may be configured to densify the coatings, and may be implemented after layer 1 or layer x (or at a point therebetween in the process) at a relatively fast heating rate e.g., greater than about 15° C./min, such as, about 100° C./min to about 300° C./min. In some examples, the heat treatment temperature may be about 500° C. to about 1500° C., with a total time duration of 0.1 to 100 hours. Additionally, or alternatively, a heat treatment configured to stabilize the phases may be implemented after layer 1 or layer x (or at a point therebetween in the process) at a relatively slow rate, e.g. about 0.5° C. to about 30° C./min. The heat treatment temperature may be about 500° C. to about 1500° C., with a total time duration of about 0.1 to about 100 hours. In some examples, stabilization of phases refers to 1) crystallization of amorphous phase and/or 2) transformation from metastable phase to stable phase.

Figure 6:
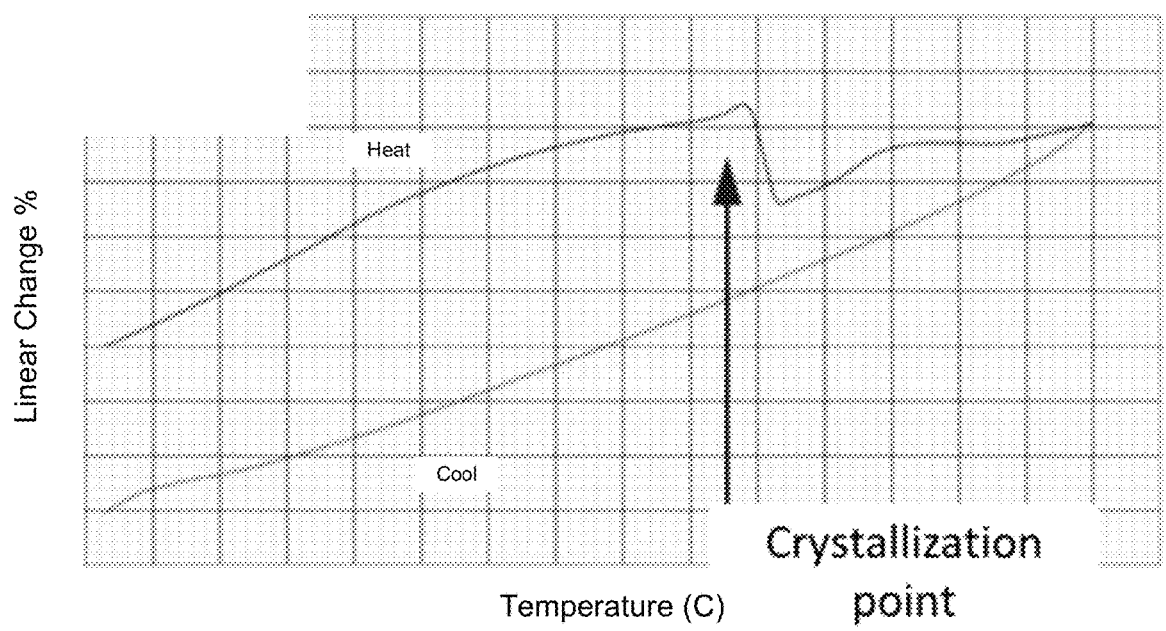
FIG. 6 is a conceptual diagram illustrating an example plot of CTE versus temperature for crystallization of an amorphous coating.
Figure 7:
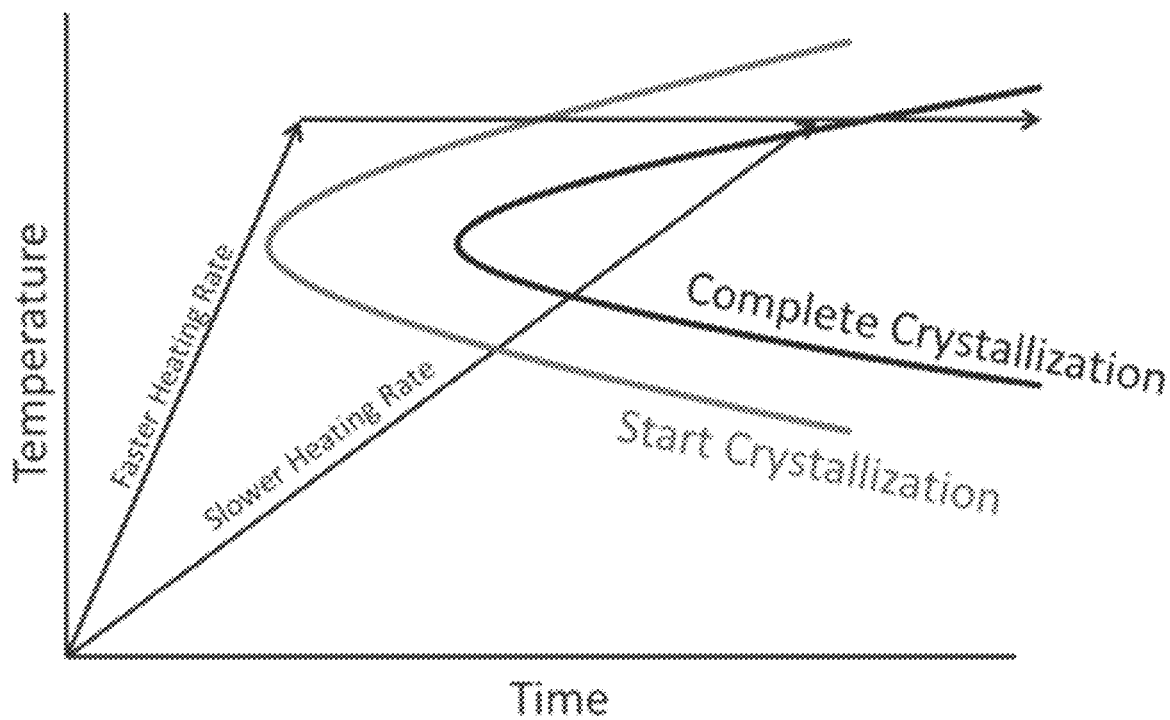
FIG. 7 is a conceptual diagram illustrating an example time-temperature-transformation curve showing the effect of heating rate on crystallization time.

In some examples, a consideration for the heat treatment(s) described herein is the crystallization of amorphous phases. In some examples, a heat treatment is performed on a coating or coating layer that is partly or entirely amorphous. The amorphous phase material may be a result of the manufacturing method employed to deposit the coating or coating layer, e.g. plasma spray or from other thermal treatments. Crystallization of the amorphous phase, e.g., either by way of a controlled heat treatment process or by way of operation of a coated component in a high temperature environment, may induce a size change. Thus, it may be desirable to control the rate of the size change in order to not over strain the coating or layer material, especially in the case of a relatively brittle material. FIG. 6 illustrate a plot of linear change percentage/CTE versus temperature for an example EBC during a heat treatment cycle showing crystallization of an amorphous coating. FIG. 7 illustrates a plot of temperature versus time for an example heat treatment of a coating, which shows that a heating rate and heat treatment temperature may be selected to slow or speed up the coating transformation rate as well as the temperature at which these transformations occur. In some examples, the transformation rates may be balanced with coupon/component/furnace heating capabilities.

In some examples, a heat treatment described herein may be an isothermal heat treatment, a localized heat treatment, or combination of the two. An isothermal heat treatment may be carried out with the component including the coating inserted in a furnace or other heated environment. A localized heat treatment may be performed with a concentrated heat source such as laser or flame torch. The type of heat treatment may be selected based upon the purpose of the heat treatment. For example, one can perform an isothermal heat treatment to stabilize the phase of the entire coating followed by a localized heat treatment on the surface. This may allow for densification only on the surface for improved oxidation and CMAS resistance without increasing the density of the entire coating, which may compromise a coating's compliance.

FIG. 1 is a conceptual and schematic diagram illustrating an example system 10 for depositing a bond coat on a substrate, heat treating the as-deposited bond coat, subsequently depositing one or more additional layers (e.g., EBC layer(s) and/or abradable layer(s)) on the heat treated bond coat, and then heat treating the as-deposited additional layers. As described herein, a heat treatment may be performed after each individual layer is deposited, after the deposition of all individual additional layers, or after multiple layers but not all layers have been deposited.

The heat treatment of the as-deposited bond coat may be configured to increase the adhesion of the bond coat to the underlying substrate. The heat treatment of the as-deposited additional layers may be configured to decrease the porosity of one or more of the as-deposited additional layers, increase the density of one or more of the as-deposited additional layers, control the microstructure and/or distribution of one or more of the as-deposited additional layers (e.g., control the size and distribution of secondary phases such as ytterbium monosilicate in the coating), and/or stabilize the phases of the one or more of the as-deposited additional layers (e.g., by transforming at least a portion of amorphous phase material to crystalline phase material in a controller manner). As shown, system 10 includes deposition device 12, heat treatment furnace 14, and transfer device 16.

Figure 2A:
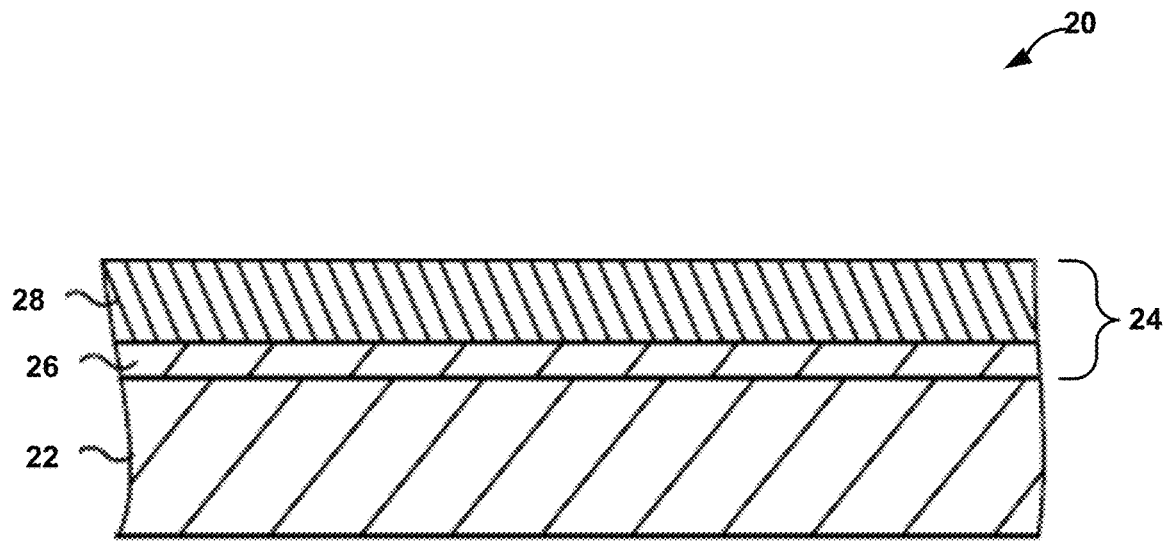
FIG. 2A is a conceptual block diagram illustrating an example article including an EBC layer and a bond coat on a substrate.
Figure 2B:
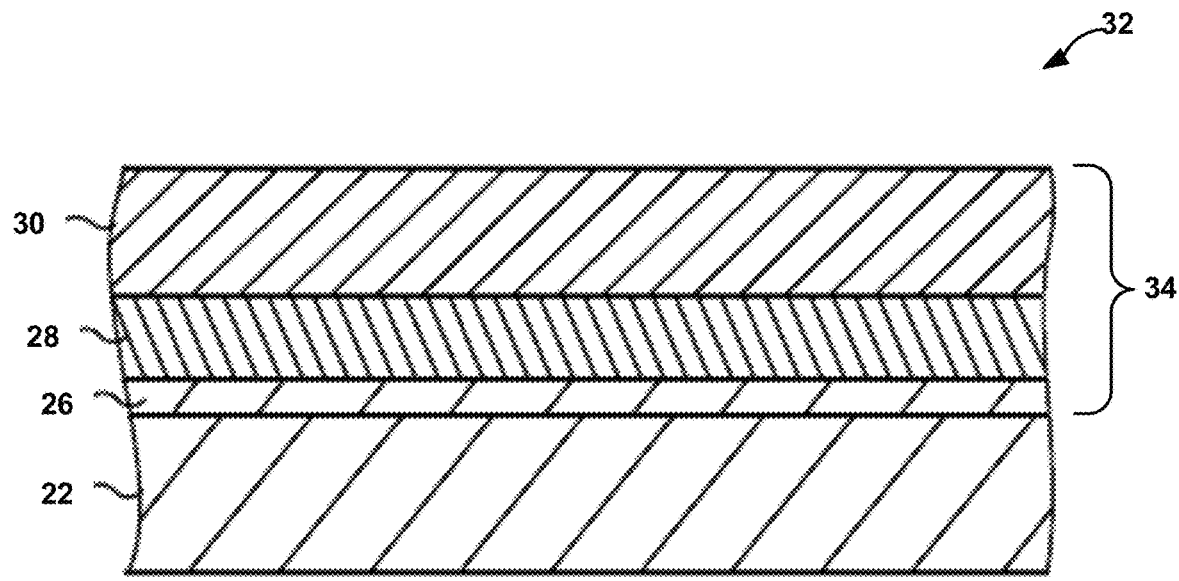
FIG. 2B is a conceptual block diagram illustrating another example article including an abradable layer, an EBC layer, and a bond coat on a substrate.

Deposition device 12 may be configured to deposit one or more layers of a coating system on a substrate to form a coated article, such as article 20 in FIG. 2A, which includes coating system 24 on substrate 22 or article 32 in FIG. 2B, which includes coating system 34 on substrate 22. In some examples, deposition device 12 may be configured to deposit coating 24 using a thermal spray process, a slurry deposition process, and/or other process suitable for depositing a coating, such as, bond coat 26, EBC 28 and/or abradable coating 30. Example thermal spray processes may include suspension plasma spray, low pressure plasma spraying, plasma spray physical vapor deposition, and air plasma spraying. In one example, deposition device 12 may be configured to deposit the one or more layers of a coating system using a plasma spray process, such as an air plasma spray process. Coatings 24 and 34 may be deposited via deposition device 12 in an atmosphere including, for example, air, an inert atmosphere, a vacuum, or the like. In some examples, the deposition of coatings 24 and 34 by deposition device 12 may take place in a heated environment or may take place at room temperature. For ease of description, the operation of system 10 will primarily be described herein with regard to articles 20 and 32 of FIGS. 2A and 2B, respectively, although other articles formed using system 10 are contemplated.

Furnace 14 may be configured to heat and maintain substrate 22 and bond coat 26 at a relatively high temperature following the deposition bond coat 26 using deposition device 12, e.g., to perform a post-deposition heat treatment of bond coat 26 on substrate 22. Likewise, after the heat treatment of bond coat 26 and the subsequent deposition of EBC 28 using deposition device 12, furnace 14 may be configured to heat and maintain substrate 22, bond coat 26, and EBC 28 at a relatively high temperature, e.g., to perform a post-deposition heat treatment of EBC 28 on substrate 22. In the case of article 32, a similar process may be employed followed by a post-deposition heat treatment of abradable coating 30 on the heat treated EBC 28, bond coat 26, and substrate 22. Furnace 14 may include an internal cavity sized and otherwise configured to contain article 20 or article 32 after the deposition of the respective layers on substrate 22. Any suitable type of furnace 14 may be used that is capable of functioning as described in this disclosure. Furnace 14 may be an air furnace or a box furnace. In one example, a box furnace may be used with a controllable heat source. In some examples, furnace 14 may include one or more suitable heat sources such as moly-disilicide and/or silicon carbide heating elements, although other types of heat sources are contemplated. In one example, a conveyor-belt furnace may be employed. In one example, an induction system may be used to directly heat article 20 to deliver high heating rates. In some examples, article 20 may be heated for heat treatment using an oxy-fuel burner rather than a furnace.

As described herein, in some example, the heat treatment of bond coat 26, EBC 28, and/or abradable coating 30 may additionally or alternatively be a more localized heat treatment performed with a concentrated heat source such as laser or flame torch. The type of heat treatment may be selected based upon the purpose of the heat treatment. For example, one can perform an isothermal heat treatment to stabilize the phase of the entire coating followed by a localized heat treatment on the surface. This may allow for densification only on the surface for improved oxidation and CMAS resistance without increasing the density of the entire coating, which may compromise a coating's compliance.

Transfer device 16 may be configured to robotically transfer article 20 or article 32 between furnace 14 and thermal spray device 12, as desired before and/or after the deposition of bond coat 26, EBC 28 and/or abradable coating 30 via deposition device 12. For example, transfer device 16 may transfer substrate 22 to thermal spray device 12 for the deposition of bond coat 26, then transfer substrate 22 coated with bond coat 26 to furnace 14 for the heat treatment of bond coat 26, then transfer the heat treated bond coat 26 and substrate 22 back to thermal spray device 12 for the deposition of EBC 28 on the heat treated bond coat 26, and then transfer substrate 22 with bond coat 26 and EBC 28 back to furnace 14 for the heat treatment of the as-deposited EBC 28. In other examples, article 20 may be manually transferred between deposition device 12 and furnace 14 as described. In the case of article, 32, a similar process may be used, with abradable coating 30 being deposited after or before the heat treatment of EBC 28 and then heat treated following the deposition.

Controller device 18 may be configured as a control device that controls deposition device 12, furnace 14, and/or transfer device 16 to operate in the manner described herein. For example, controller device 18 may be configured to control the temperature, including heating rate and temperature of furnace 14, e.g., during the post-deposition heat treatment(s) of bond coat 26, EBC 28 and abradable coating 30. Controller device 18 may be configured to control transfer device 16 to control the transfer of articles 20 and 32 between deposition device 12 and furnace 14. Controller device 18 may be communicatively coupled to at least one of deposition device 12, furnace 14, and/or transfer device 16 using respective communication connections. Such connections may be wireless and/or wired connections. While controller device 18 is shown as a single device, in other examples, controller device 18 may be more than one controller device, such as, e.g., where each of furnace 14, deposition device 12 and transfer device 16 are controlled by different controller devices.

Controller device 18 may include, for example, a desktop computer, a laptop computer, a workstation, a server, a mainframe, a cloud computing system, or the like. Controller device 18 may include or may be one or more processors or processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing circuitry" as used herein may refer to any of the foregoing structure or any other structure suitable for implementation of the techniques described herein. In addition, in some examples, the functionality of controller device 18 may be provided within dedicated hardware and/or software modules.

In one example, system 10 may be configured to form an article such as article 20 shown in FIG. 2, which includes coating system 24 on substrate 22. For example, system 10 may be configured to deposit one or more layers of coating system 24 on substrate 24 using deposition device 12, e.g., by slurry deposition, air plasma spraying or other thermal spray deposition process. Following the deposition of EBC 28 and optional bond coat 26 on substrate 22 by deposition device 12, article 20 may be moved to furnace 14 (e.g., via transfer device 16) for a post deposition heat treatment of EBC 28. As will be described further below, the post-deposition heat treatment in furnace 14 may be controlled by controller device 18 so that bond coat 26 is at an elevated temperature for a desired duration of time. Similarly, for the subsequent heat treatment of EBC 28 and/or abradable coating 30 (individually or in combination), EBC 28 may be at an elevated temperature (e.g., a temperature at or above the crystallization temperature of EBC 28 and/or abradable coating 30) for a desired duration of time. For each heat treatment, controller device 18 may control the specific rate that the temperature is increased to reach the elevated heat treatment temperature.

FIG. 2A is a conceptual diagram illustrating an example article 20 including a substrate 22 and coating system 24. Coating system 24 includes bond coat 26 and EBC 28. In some examples, article 20 may include a component of a gas turbine engine. For example, article 20 may include a part that forms a portion of turbine blades and vanes.

FIG. 2B is a conceptual diagram illustrating another example article 32 including a substrate 22 and coating system 34. Coating system 34 includes bond coat 26 and EBC 28, which may be the same or substantially similar to that of the similarly numbered layers of coating system 24 of FIG. 2A. Unlike that of coating system 24, coating system 34 includes abradable coating 30 on EBC 28. In some examples, article 32 may include a component of a gas turbine engine. For example, article 20 may include a part that forms a portion of a flow path structure, a seal segment, a blade track, an airfoil, a blade, a vane, a combustion chamber liner, or another portion of a gas turbine engine.

Although not shown in FIGS. 2A and 2B, EBC 28 may include plurality of voids (e.g., pores, intercolumnar voids, cracks, and/or the like) within the layer. In some examples, the heat treatment of EBC 28 may decrease the porosity of the as-deposited EBC 28, e.g., by rapidly increasing the temperature of EBC 28 during a post-deposition heat treatment to at least partially fill or close at least some of the voids during the heat treatment. Conversely, in some examples, the heat treatment of EBC 28 may lock in the microstructure (e.g., substantially maintain the microstructure) of the as-deposited EBC 28, e.g., by increasing the temperature of EBC 28 at a relatively slow rate during the post-deposition heat treatment. In such examples, EBC 28 may be deposited in a manner that provides for a relatively low porosity and/or high density in the as-deposited coating so that the heat treated EBC maintains the relatively low porosity/high density when the microstructure is "locked-in" with the heat treatment.

Substrate 22 may include a material suitable for use in a high-temperature environment. In some examples, substrate 22 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 22 includes a ceramic, the ceramic may be substantially homogeneous.

In examples in which substrate 22 includes a CMC, substrate 22 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like. In some examples, substrate 22 may take the form of a RBSiC substrate.

Substrate 22 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

Coating 24 may help protect underlying substrate 22 from chemical species present in the environment in which article 20 is used, such as, e.g., water vapor, calcia-magnesia-alumina-silicate (CMAS; a contaminant that may be present in intake gases of gas turbine engines), or the like. Additionally, in some examples, coating 24 may also protect substrate 22 and provide for other functions besides that of an EBC, e.g., by functioning as a thermal barrier coating (TBC), abradable coating, erosion resistant coating, and/or the like.

As illustrated in FIG. 2, bond coat 26 of coating 24 is on substrate 22. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 2, bond coat 26 of coating system 24 may be directly on substrate 22.

Bond coat 26 may be between EBC 28 and substrate 22 and may increase the adhesion of EBC 28 and abradable coating 30 to substrate 22. In some examples, bond coat 26 may include silicon and take the form of a silicon bond layer. In some examples, bond coat 16 may include silicon, a metal silicide, RE monosilicate, RE disilicate, hafnium silicate, mullite, SiC, a metal oxide or a mixture thereof. Bond coat 16 may be in direct contact with substrate 22 and EBC 28. In some examples, bond coat 26 has a thickness of approximately 25 microns to approximately 250 microns, although other thicknesses are contemplated.

As described below, the as-deposited bond coat 26 may be heat treated prior to the deposition of EBC 28. The heat treatment may be configured to increase the adhesion of bond coat 26 to substrate 22, e.g., as compared to an example in which bond coat 26 is not heat treated as described herein. The increased adhesion may allow for coating system 24 including EBC 28 (and/or abradable coating 30 as in the example of FIG. 2B) to be relatively thick without delaminating from substrate 22. For example, the adhesion of bond coat 26 to substrate 22 may be increased (strengthened) by heat treating the as-deposited bond coat 26 in order to decrease the susceptibility of bond coat 26 and overlying EBC 28 to delamination from substrate 22, e.g., as compared to an example in which bond coat 26 is not heat treated as described herein. Additionally, or alternatively, the heat treatment of bond coat 26, alone or in combination with the subsequent heat treatment(s) of EBC 28 and abradable coating 30, may increase the strengthen the adhesion at the interface between bond coat 26 and EBC 28 and the interface between EBC 28 and abradable coating 30, as well as increasing the cohesive strength of EBC 28 and abradable coating 30. As a result, coatings 24 and 34 may be relatively thick while providing suitable performance without delaminating from or on substrate 22.

In examples in which substrate 22 includes a ceramic or CMC, bond coat 26 may include a ceramic or another material that is compatible with the material from which substrate 22 is formed. For example, bond coat 26 may include mullite (aluminum silicate, $Al_6Si_2O_{13}$), silicon metal or alloy, silica, a silicide, or the like. Bond coat 26 may further include other elements, such as a rare earth oxide or rare earth silicate including an oxide or silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 26 may be selected based on the chemical composition and/or phase constitution of substrate 22 and the overlying layer (e.g., EBC 28 and/or abradable coating 30). For example, if substrate 22 includes a ceramic or a CMC, bond coat 26 may include silicon metal or alloy or a ceramic, such as, for example, mullite.

In some cases, bond coat 26 may include multiple layers. For example, in some examples in which substrate 22 includes a CMC including silicon carbide, bond coat 26 may include a layer of silicon on substrate 22 and a layer of mullite, a rare earth silicate, or a mullite/rare earth silicate dual layer on the layer of silicon. In some examples, a bond coat 26 including multiple layers may provide multiple functions of bond coat 26, such as, for example, adhesion of substrate 22 to an overlying layer (e.g., EBC 28 and/or abradable layer 30), chemical compatibility of bond coat 26 with each of substrate 22 and the overlying layer, a better coefficient of thermal expansion match of adjacent layers, or the like.

Bond coat 26 may be applied on substrate 22 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

Coating systems 24 and 34 include EBC 28, which may be configured to help protect substrate 22 against deleterious environmental species, such as CMAS and/or water vapor. EBC 28 may include at least one of a rare-earth oxide, a rare-earth silicate, an aluminosilicate, or an alkaline earth aluminosilicate. For example, EBC 28 may include mullite, barium strontium aluminosilicate (BSAS), barium aluminosilicate (BAS), or strontium aluminosilicate (SAS). In some examples, EBC 28 may include at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

EBC 28 may be any suitable thickness. For example, EBC 28 may be about 0.005 inches (about 127 micrometers) to about 0.100 inches (about 2540 micrometers). In examples in which EBC 28 is a non-abradable EBC, EBC 28 may have a thickness of about 0.001 inches (about 25.4 micrometers) to about 0.030 inches (about 762 micrometers).

As described above, FIG. 2B is a conceptual diagram illustrating an example article 32 including a substrate 22 and coating system 34. Coating system 34 includes bond coat 26 and EBC 28, which may be the same or substantially similar to that of the similarly numbered layers of coating system 24 of FIG. 2B. In such a configuration, coating system 24 may be configured such that abradable coating 30 has a greater porosity than EBC 28, and the porosity of abradable coating 30 may be provided such that the outer surface of abradable coating 30 is abraded, e.g., when brought into contact with an opposing surface such as a blade tip. Abradable coating 30 may be on EBC 28, which may provide for better adhesion of abradable coating 30 to bond coat 26 or substrate 22. In some examples, abradable coating 30 may be about 0.005 inches (about 127 micrometers) to about 0.100 inches (about 2540 micrometers) thick, such as about 0.030 inches or greater. In other examples, abradable coating 30 may have a different thickness.

The composition of abradable coating 30 may be selected from similar compositions as those listed above for EBC 28. In some examples, the composition of abradable coating 30 may be the same or substantially similar to the composition of EBC 28. In other examples, the compositions may be different. Regardless of the composition or the thickness of EBC 28 or abradable coating 30 of FIG. 2B, EBC 28 and abradable coating 30 may include a plurality of voids. For example, EBC 28 and abradable coating 30 may have a porous microstructure or a columnar microstructure. A porous microstructure may include a plurality of pores (e.g., voids) within the layer material, and a columnar microstructure may include columns of the layer material extending from the surface of a substrate (or another coating layer) with elongated intercolumnar voids. A porous or a columnar microstructure may improve the in-plane strain tolerance and/or the thermal cycle resistance of EBC 28 and abradable coating 30. In some examples, an average minimum dimension of the voids, such as, for example, an average minimum diameter of a pore of a porous microstructure, may be about 0.1 micrometers (μm) to about 20 μm.

In some example, the porosity of EBC 28 and the porosity of abradable coating 30 may be different, e.g., with abradable coating 30 having a higher porosity than EBC 28. In some examples, EBC 28 may include a porosity of less than about 10%, such as about 1% to about 5%, where porosity is measured as a percentage of pore volume divided by total volume of EBC 28. The porosity of EBC 28 may be the porosity following the EBC heat treatment described herein or may be the porosity of the EBC as deposited. In some examples, the heat treatment of EBC 28 may be selected to substantially maintain the porosity or other void volume of EBC 28 as deposited so that the porosity or other void volume of the heat treated EBC 28 is substantially the same as the as-deposited coating. Abradable coating 30 may include a porosity of more than about 5%, such as about 7% to about 20% or up to about 50%, where porosity is measured as a percentage of pore volume divided by total volume of layer 32. The porosity of abradable coating 30 may be the porosity following the abradable coating heat treatment described herein. In each case, the porosity of EBC 28 and abradable coating 30 may be measured using mercury porosimetry, optical microscopy or Archimedean method.

In some examples, a post-EBC deposition heat treatment may be used to decrease the porosity, microcracks, and/or other void volume of EBC 28, e.g., prior to deposition of abradable coating 30. For examples, the as-deposited EBC 28 may include open pores (e.g., interconnected pores in the layer) and/or microcrack networks. The open pores and/or microcracks may results in EBC 28 being permeable to gas, which may allow for undesirable oxidation and volatilization of article 20. The post deposition heat treatment of EBC 28, e.g., using a temperature increase of greater than 15° C./min, may decrease the open porosity and/or microcracks in EBC 28, e.g., as compared to the as-deposited EBC and/or a similar coating heat treated using a temperature increase of 15° C./min or less. The percentage of open porosity and/or microcracks in EBC 28 may be decreased to lower the gas permeability of EBC 28, e.g., which will enhance the EBCs performance as a barrier to protect substrate 22 from oxidation and volatilization.

The void volume (e.g., porosity and/or microcracks) of EBC 28 as deposited may be decreased by heat treatment of EBC 28 following deposition. In some examples, the heat treatment of EBC 28 may decrease the porosity and/or microcracks of EBC 28 by at least about 25 percent (e.g., from about 6% to about 4.5%), at least about 33% (e.g., from about 6% to about 4%), or at least about 50 percent (e.g., from about 6% to about 3%), e.g., as compared to the porosity of the as-deposited EBC 28 and/or a similar coating that underwent heat treatment with a slower rate of temperature increase (e.g., 15° C./min or less).

In other examples, the microstructure (e.g., columnar or porous) of EBC 28 as deposited may be substantially maintained by the heat treatment, e.g., while also transitioning at least a portion of amorphous phase material of EBC 28 to crystalline phase with the heat treatment. In such examples, a relatively low heating rate (e.g., about 15° C./min or less) may be used. The heat treatment of EBC 28 may decrease the porosity or other void volume of EBC 28 by less than about 5% compared to the porosity or other void volume of abradable coating 30 before the heat treatment, such as less than about 3% or less than about 2% or less than about 1%. As described below, in some examples, it may be desirable to not substantially decrease the void volume and/or modify the microstructure of EBC 28 from that as deposited using a heat treatment. For example, a heat treatment to reduce the porosity or other void volume of EBC 28 as deposited may cause the outer surface of EBC 28 to smooth or become less rough. As a result, the adhesion of a subsequently deposited layer such as abradable coating 30 may be less as a result of the "smoothed" surface of EBC 28. Accordingly, in some examples, the heat treatment of the as-deposited EBC 28 does not substantially decrease the surface roughness (e.g., by using a relatively low heating rate) to allow for better adhesion of abradable layer 30 or other subsequently deposited overlying layer.

As described herein, in some examples, a post-deposition heat treatment of abradable coating 30 may be performed on abradable coating 30, e.g., after the heat treatment of EBC 28. The heat treatment may maintain or only slightly reduce the porosity of abradable coating 30, e.g., while also transforming amorphous phase of the as-deposited abradable coating 30 to crystalline phase. In some examples, the porosity of abradable coating 30 may be substantially the same before and after the heat treatment, or may be reduced by less than about 10% compared to the porosity of abradable coating 30 before the heat treatment, such as less than about 5% or less than about 3% or less than about 1%.

In some examples, the porosity or other microstructure of the as-deposited EBC 28 and abradable coating 30 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within coating 24.

In other examples, the porosity or other microstructure of EBC 28 and abradable coating 30 may be controlled by the use of coating material additives and/or processing techniques to create the desired porosity or other microstructure. For example, to form an abradable layer such as abradable coating 30 of coating 24 in FIG. 2, a fugitive material that melts or burns at the use temperatures of the component (e.g., a blade track) may be incorporated into the coating material that forms abradable coating 30. The fugitive material may include, for example, graphite, hexagonal boron nitride, or a polymer such as a polyester, and may be incorporated into the coating material prior to deposition of the coating material on substrate 22 to form abradable coating 30. The fugitive material then may be melted or burned off in a post-formation heat treatment, or during operation of the gas turbine engine, to form pores in coating 24. The post-deposition heat-treatment may be performed at up to about 1500° C. for a component having a substrate 22 that includes a CMC or other ceramic.

In other examples, the porosity or other microstructure of coating systems 24 and 34 may be created or controlled in a different manner, and/or coating system 24 may be deposited on substrate 22 using a different technique. For example, coating systems 24 and 34 may be deposited using a wide variety of coating techniques, including, for example, a thermal spraying technique such as plasma spraying or suspension plasma spraying, physical vapor deposition (PVD) such as EB-PVD (electron beam physical vapor deposition) or DVD (directed vapor deposition), cathodic arc deposition, slurry process deposition, sol-gel process deposition, or combinations thereof.

In some examples in which EBC 28 or abradable coating 30 has a columnar microstructure, EBC 28 and/or abradable coating 30 may be deposited on substrate 32 using a suspension plasma spray technique, an EB-PVD technique, a plasma spray physical vapor deposition (PSPVD) technique, or a directed vapor deposition (DVD) technique. In some examples, EBC 28 and/or abradable coating 30 including a columnar microstructure may include a dense vertically cracked (DVC) coating, which in some cases, may be deposited on substrate 22 using an air plasma spray technique.

While the examples of FIGS. 2A and 2B show bond coat 26 as being directly on substrate 22, in other examples, one or more intermediate layers may be formed between substrate 22 and bond coat 26. For example, an intermediate layer that functions as a diffusion barrier may be formed between substrate 22 and bond coat 26. In some examples, a SiC layer, e.g., a CVD and thermal sprayed (e.g., high-velocity oxygen fuel) SiC layer, may be formed as such a diffusion barrier for reducing impurities coming from the substrate that may negatively impact the thermally grown oxide (e.g., by increasing the rate of crystallization which causes cracking in the layer upon thermal cycling).

While the examples of FIGS. 2A and 2B show EBC 28 as being directly on bond coat 26, in other examples, one or more intermediate layers may be formed between EBC 28 and bond coat 26. For example, an intermediate layer may be formed between EBC 28 and bond coat 26 that functions an oxygen diffusion barrier, such as a dense mullite layer. The purpose of such an intermediate layer would be to reduce the oxidation rate of bond coat 26.

Figure 3:
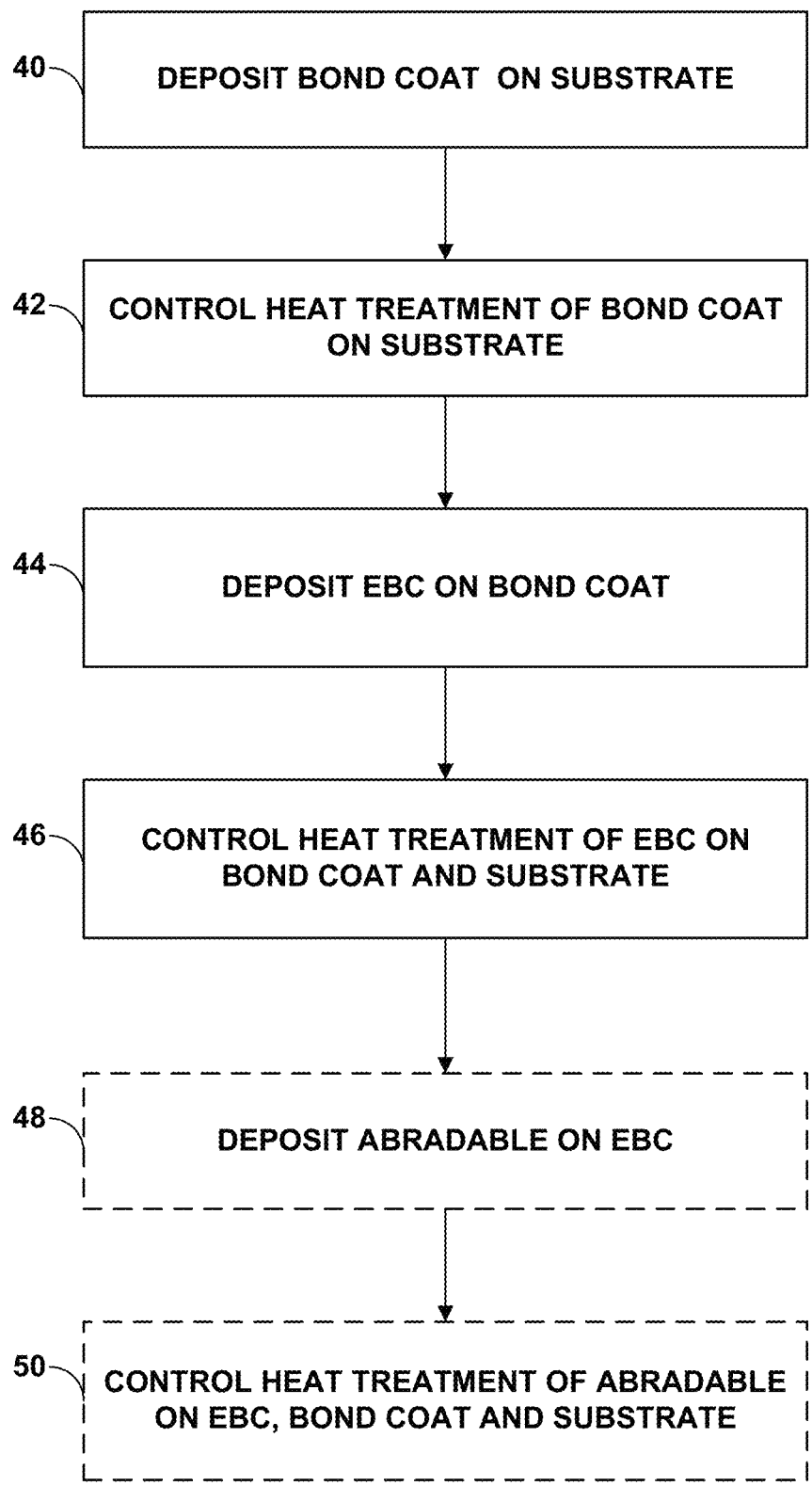
FIG. 3 is a flow diagram illustrating an example technique for forming an article in accordance with an example of the disclosure.

FIG. 3 is a flow diagram illustrating an example technique for forming a coating system on a substrate such as coating system 24 of article 20 and coating system 34 of article 32 on substrate 22. The technique of FIG. 3 will be described with respect to system 10 of FIG. 1 and articles 20 and 32 of FIGS. 2A and 2B for ease of description only. A person having ordinary skill in the art will recognize and appreciate that the technique of FIG. 3 may be implemented using systems other than system 10 of FIG. 1, may be used to form articles other than articles 20 and 32 of FIGS. 2A and 2B, or both.

As shown in FIG. 3, substrate 22 may be positioned within deposition device 12 and controller device 18 may control deposition device 12 to deposit bond coat 26 on substrate 22 (40). For example, deposition device 12 may deposit bond coat 26 by thermal spraying (e.g., air plasma spraying), slurry deposition, and/or vapor deposition process under the control of controller device 18 (40). In some examples, a tape casting process may be used to deposit bond coat 26. The temperature within deposition device 12 may be approximately room temperature or elevated above room temperature. Bond coat 26 may be formed by depositing a single layer of material or multiple layers of material.

Following deposition of bond coat 26 on substrate 22, the article may be transferred to furnace 14 by transfer device 16 for a first post-deposition heat treatment. Once within furnace 14, controller device 18 may control the temperature of furnace to heat treat the as-deposited bond coat 26 by heating bond coat 26 to or above a selected temperature for a selected period of time (42). In some examples, the first post-deposition heat treatment may take place before or after bond coat 26 cools to room temperature following its deposition. The heat treatment may take place in an air, oxygen, water vapor, or vacuum environment, or combination thereof. The post-deposition heating rate, heat treatment temperature, duration, and/or cooling rate may be controlled by controller device 18 and may be selected to increase the adhesion of bond coat 26 to surface of substrate 22, e.g., as compared to the as-deposited bond coat 26. In some examples, heat treatment may be implemented at a heating rate of, e.g., about 0.5° C./min to about 30° C./min. The heat treatment temperature may be about 500° C. to about 1400° C. with a total time duration of about 0.1 to about 100 hours. Other example heating rates, heat treatment temperatures, and time durations are contemplated.

While not being bound by theory, the heat treatment of the as-deposited bond coat 26 (42) may increase the adhesion of bond coat 26 to substrate 22 by promoting or otherwise causing diffusion bonding and/or chemical bonding between the bond coat and substrate. For example, the strong bonding may be established by either silicon diffusion and/or chemically forming silicon oxides by silicon chemically react with oxygen. Comparatively, in some example in which bond coat 26 is not heat treated after being formed on substrate 22, bond coat 26 may be attached to substrate 22 primarily based on the mechanical attachment between substrate 22 and bond coat 26. Such mechanical attachment may be increased by preparation of the substrate surface prior to bond coat 26 deposition (e.g., by mechanically roughening the surface of the substrate). In some examples, by heat treating the as-deposited bond coat 26 following the deposition of bond coat 26 on substrate 22 (40), suitable and increased attachment of the bond coat may be achieved without mechanical roughening of the substrate surface or with a lesser mechanically surface roughening. In some examples, the surface of substrate 22 may not be mechanically roughed or otherwise prepared prior to the deposition of bond coat 26 to increase the surface roughness. In other examples, the surface of substrate 22 may be prepared to increase the surface roughness but to a lesser degree based on the increase adhesion of bond coat 26 to substrate 22 resulting from the post-deposition heat treatment.

Following the deposition (40) and heat treatment (42) of bond coat 26 on substrate 22, EBC 28 may be deposited onto bond layer 26, e.g., using deposition device 12. For examples, deposition device 12 may deposit EBC 28 by thermal spraying (e.g., air plasma spraying), slurry deposition, and/or vapor deposition process under the control of controller device 18 (44). In some examples, a tape casting process may be used to deposit EBC 28. The temperature within deposition device 12 may be approximately room temperature or elevated above room temperature. EBC 28 may be formed by depositing a single layer of material or multiple layers of material and separate heat treatments may or may not be performed for each layer of a combination of some but not all layers.

Following deposition of EBC 28 on bond coat 26, the article may be transferred to furnace 14 by transfer device 16 for a second heat treatment. Once within furnace 14, controller device 18 may control the temperature of furnace to heat treat the as-deposited EBC 28 by heating EBC 28 to or above a selected temperature for a selected period of time (46). In some examples, the EBC heat treatment may take place before or after EBC 28 cools to room temperature following its deposition. The EBC heat treatment heating rate, heat treatment temperature, duration, and/or cooling rate may be controlled by controller device 18. In some examples, the heat treatment may be configured to one or more of decrease the porosity or other void volume of EBC 28, increase the density of EBC 28, maintain the density and/or microstructure of EBC 28, or transform amorphous phase material in the as-deposited EBC 28 to crystalline phase material.

In some examples, the post-deposition heat treatment of EBC 28 may be configured to increase the density of the as-deposited EBC 28, and/or decrease the porosity, microcrack networks, and/or other void volume of EBC 28. In some examples, the heat treatment may include increasing the temperature of EBC 28 at a relatively fast rate (e.g., a rate greater than 15° C./min, such as, about 100° C./min to about 300° C./min). In some examples, EBC 28 may be at approximately room temperature (e.g., about 23° C.) at the beginning of the EBC heat treatment. The temperature of EBC 28 may be increased (e.g., by heating in furnace 14) at the relatively high rate to the desired elevated heat treatment temperature. In some examples, the high heating rate may be accomplished by pre-heating furnace 14 prior to transfer of EBC 28, bond coat 26, and substrate 22 to furnace 14. In some examples, the heat treatment temperature may be at or above about 500° C. to about 1500° C. EBC 28 may be held at or above the heat treatment temperature for a desired period of time (e.g., about 0.1 hours to about 100 hours).

Controller device 18 may control furnace 14 to hold a substantially constant heat treatment temperature within furnace or a heat treatment temperature that varies within a prescribed range over a selected period of time.

Additionally, or alternatively, EBC 28 may undergo a heat treatment to stabilize the phases, e.g., within the as-deposited EBC 28. Stabilization of phases may refer to crystallization of amorphous phase and/or transformation from metastable phase to stable phase. In some examples, the heat treatment may include increasing the temperature of EBC 28 at a relatively slow rate (e.g., a rate less than 30° C./min, such as, about 0.5° C./min to about 30° C./min). In some examples, the heat treatment temperature may be at or above about 500° C. to about 1500° C. EBC 28 may be held at or above the heat treatment temperature for a desired period of time (e.g., about 0.1 hours to about 100 hours). Controller device 18 may control furnace 14 to hold a substantially constant heat treatment temperature within furnace or a heat treatment temperature that varies within a prescribed range over a selected period of time.

In some examples, the as-deposited EBC 28 may have a relatively high amorphous phase concentration, e.g., due to the high cooling rates/quenching of the particles upon impact with substrate 22 during deposition. For example, the as-deposited EBC 28 may have an amorphous phase of at least about 70 weight percent (wt %), such as, at least about 85 wt %. Conversely, the as-deposited EBC 28 may have a crystalline phase of less than about 30 wt %, such as less than about 15 wt %. As noted above, without a post-deposition heat treatment, the amorphous phase may change to a crystalline structure over time when subjected to higher temperatures, e.g., during operation of a jet engine. An uncontrolled transition from amorphous to crystalline structure with time may also result in volumetric changes and, thus, internal stresses in the layer(s). Thus, the as-deposited EBC 28 may undergo a post-deposition heat treatment that increases the crystalline phase concentration of EBC 28 on substrate 22. For example, furnace 14 may be at a treatment temperature of at or above the crystalline temperature of the layer(s) of EBC 28.

In some examples, during the heat treatment, EBC 28 may be held within furnace 14 at the heat treatment temperature such that EBC 28 reaches a temperature at or above the crystalline phase temperature of EBC 28. The combination of EBC 28, bond coat 26, and substrate 22 may be held within furnace 14 at the heat treatment temperature such that EBC 28 reaches a temperature at or above the temperature at which the amorphous phase transitions to a crystalline phase. The combination of EBC 28, bond layer 26, and substrate 22 may be held within furnace 14 for heat treatment for a suitable amount of time to provide for a desired amount of crystalline phase in EBC 28.

As noted above, crystallization may induce a size change (e.g., as shown in FIG. 6) so the rate of temperature change may be controlled in order to not over strain the coating material especially in a brittle material. FIG. 7 shows how a heating rate and heat treatment temperature may be selected to slow or speed up the coating transformation rate as well as the temperature at which these transformations occur. These transformation rates may be balanced with coupon/component/furnace heating capabilities.

In some examples, the relatively high rate of temperature change to the elevated heat treatment temperature may allow the amorphous phase of the as-deposited coating to flow, e.g., to fill the pores (e.g., interconnected pores), microcracks, and/or other voids of the as-deposited coating, before transitioning to crystalline phase. The filling of the pores, microcracks, and/or other voids may reduce the gas permeability of the one or more layers EBC 28 and/or bond layer 26. In some examples, the porosity and/or microcracks of EBC 28 and/or bond layer 26 may be decreased by the first heat treatment (44). In some examples, the heat treatment of EBC 28 may decrease the porosity and/or microcracks of EBC 28 by at least about 25 percent (e.g., about 6% to about 4.5%), at least about 33% (e.g., from about 6% to about 4%), or at least about 50 percent (e.g., from about 6% to about 3%), e.g., as compared to the porosity of the as-deposited EBC 28 and/or a similar coating that has been heat treated with a slower rate of temperature increase (e.g., 15° C./min or less). In some examples, EBC 28 and/or bond layer 26 may be substantially hermetic following the post deposition heat treatment.

Following the post-deposition heat treatment of EBC 28, the combination of EBC 28, bond coat 26, and substrate 22 may be cooled within furnace 14 or outside furnace from that of the heat treatment temperature. In some examples, controller device 18 may control the rate of cooling of furnace 14 over a particle period of time such that EBC 28 cools at a controlled rate over the period of time, as compared to simply removing the combination of EBC 28, bond coat 26, and substrate 22 from furnace 14 and or simply turning off furnace 14 while article 20 is inside. In other example, controller device 18 may simply turn off the heating of furnace 14 or the combination of EBC 28, bond coat 26, and substrate 22 may be removed from furnace 14 into a cooler environment.

In some examples, optionally following the EBC heat treatment step (46), the combination of EBC 28, bond coat 26, and substrate 22 may be transferred to deposition device 12 and controller device 18 may control deposition device 12 to deposit abradable coating 30 on EBC 28 (48), e.g., to form article 32. For example, deposition device 12 may deposit abradable coating 30 by thermal spraying (e.g., air plasma spraying) or slurry deposition under the control of controller device 18 (48). In some examples, a tape casting process may be used to deposit abradable coating 30. The same deposition device that was used to for the deposition of EBC 28 and bond coat 26 may be used to deposit abradable coating 30, or a different deposition device may be used. The same deposition process that was used to for the deposition of EBC 28 and bond coat 26 may be used to deposit abradable coating 30, or a different deposition process may be used.

In some examples, the as-deposited abradable coating 30 may have a relatively high porosity (e.g., greater than about 5%, such as, about 7% to about 40%). The porosity of the as-deposited coating 30 may be achieved by removing as fugitive material from the abradable coating as described above. The as-deposited abradable coating 30 may have a greater porosity than the heat treated EBC 28.

Following the deposition of abradable coating 30 on EBC 28 (48), article 32 may or may not undergo another heat treatment step to heat treat abradable coating 30. In some examples, following the deposition of abradable coating 30 on EBC 28, article 32 may be transferred to furnace 14 by transfer device 16 (48) for an optional post-abradable coating deposition heat treatment (50). Once within furnace 14, controller device 18 may control the temperature of furnace to heat treat the as-deposited abradable coating 30 by heating abradable coating 30 to or above a selected temperature for a selected period of time (50). In some examples, the post-abradable coating deposition heat treatment may take place before or after abradable coating 30 cools to room temperature following its deposition. The post-abradable coating deposition heat treatment temperature and duration within furnace 14 may be controlled by controller device 18 and may be selected to increase the crystalline phase concentration of abradable coating 30. For example, furnace 14 may be at a treatment temperature of at or above the crystalline temperature of the layer(s) of abradable coating 30.

In some examples, the post-deposition heat treatment of abradable coating 30 may be configured to maintain the porosity and/or microcrack networks of abradable coating 30. In some examples, the abradable coating heat treatment may include increasing the temperature of abradable coating 30 at a relatively slow rate (e.g., a rate less than 15° C./min, such as, less than or equal to about 10° C./min). In some examples, abradable coating 30 may be at approximately room temperature (e.g., about 23° C.) at the beginning of the heat treatment. The temperature of abradable coating 30 may be increased (e.g., by heating in furnace 14) at the relatively slow rate to the desired elevated heat treatment temperature. In some examples, the slow heating rate may be accomplished by not pre-heating furnace 14 prior to transfer of article 20 to furnace 14. In some examples, the heat treatment temperature may be at or above about 500° C. to about 1500° C. Abradable coating 30 may be held at or above the heat treatment temperature for a desired period of time (e.g., about 0.1 hours to about 100 hours). Controller device 18 may control furnace 14 to hold a substantially constant heat treatment temperature within furnace or a heat treatment temperature that varies within a prescribed range over a selected period of time. In some examples, the heating rate, cooling rate, duration, and/or heat treatment temperature of the abradable heat treatment (50) may be different than the EBC heat treatment (46).

In some examples, the heat treatment of abradable coating 30 may be tailored to maintain or only nominally reduce the porosity or other void volume of the abradable coating 30 prior to the heat treatment. As described above, it has been found that is some cases, increasing a temperature at a relatively low rate (e.g., less than 15° C./min, such as about 10° C./min) for a heat treatment of a coating may cause the amorphous phase to transition to crystalline phase with substantially no flow such that the microstructure of the coating is effectively "locked in" without the amorphous material flowing into the pores and microcrack of the as-deposited material. In such an example, the porosity (e.g., open porosity and/or microcracks) of the as-deposited coating may not substantially decrease as a result of the heat treatment. In some examples, the porosity or other void volume of abradable coating 30 may be substantially the same as the porosity or other void volume of abradable coating 30 prior to the heat treatment, or to be reduced by less than approximately 10 percent, such as about 0.5 percent to about 5 percent. In some examples, the porosity of abradable coating 30 following the heat treatment (50) may be greater than about 5% such as, about 7% to about 40%. The porosity of abradable coating 30 following the heat treatment may be greater than the porosity of the heat treated EBC 28.

The technique of FIG. 3 is one example of a process for forming an article having both an EBC and abradable coating, wherein the bond coat is heat treated prior to the deposition of the EBC and wherein the EBC is heat treated prior to the deposition and heat treatment of the abradable coating. In some examples, after thermal spraying of the EBC (or otherwise depositing) and before deposition of the abradable coating, the EBC may be heat treated under a particular set of conditions that promote a dense/low porosity EBC, for example a high heating rate, e.g., greater than 15° C./min, such as, about 100° C./min or greater. After the EBC is heat treated and abradable coating is thermally sprayed (or otherwise deposited) on top of the EBC, a second heat treatment may be performed with a second set of conditions that maintain the porous structure of the abradable coating, for example a slow heating/cooling rate of 10° C./min.

Figure 4:
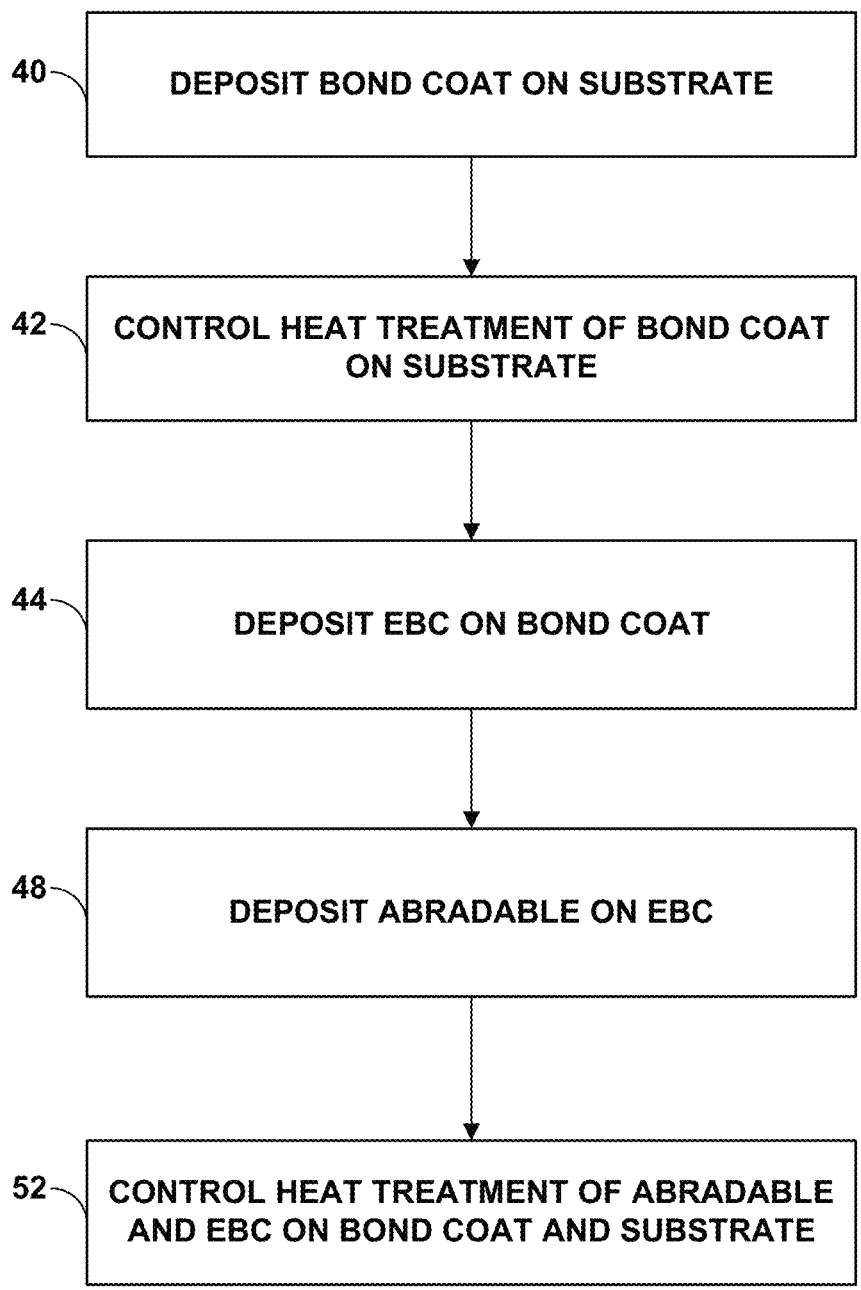
FIG. 4 is a flow diagram illustrating another example technique for forming an article in accordance with an example of the disclosure.

However, in such an example, the heat treatment of EBC 28 to densify the EBC 28 and/or reduce the porosity (or other void volume) of EBC 28 may result in a smoothing of the surface of EBC 28. For example, the heat treated EBC 28 may have a lower surface roughness compared to the as-deposited EBC 28 surface roughness. As such, the degree of the attachment between EBC 28 and abradable layer 30 may be reduced, e.g., as a result of a reduced mechanical attachment. Thus, as an alternative, EBC 28 may be deposited (44) in a manner that provides for a relatively dense/low porosity EBC 28 as deposited (e.g., porosity less than about 5%, such as less than about 3% or less than about 1%) and without a heat treatment post-EBC deposition and pre-abradable coating 30 deposition to increase the density and/or reduce the porosity of EBC 28. Rather, in such an example, abradable coating 30 may be deposited on EBC 28 without EBC 28 first being heat treated as described with regard to FIG. 3. FIG. 4 is a flow diagram illustrating an example of such process. As shown in FIG. 4, bond coat 26 may be deposited on substrate 22 (40) and heat treated (42) in the same or similar manner as describe with regard to FIG. 3. Following the heat treatment of bond coat 26, EBC 28 may be deposited so that EBC 28 is relatively dense and/or exhibits a low porosity or other void volume (44). Abradable coating 30 may then be deposited on EBC 28 without first heat treating EBC 28 (48).

As shown in FIG. 4, following the deposition of abradable coating 30, the combination of abradable coating 30 and EBC 28 may undergo a heat treatment (52). In some examples, the heat treatment may be carried out in furnace 14 and may be configured to lock in microstructure of one or both of EBC 28 and abradable coating 30. Additionally, or alternatively, the heat treatment 14 may be configured to crystallize at least a portion of amorphous phase material of EBC 28 and/or abradable coating 30, e.g., as described above with regard to FIG. 3. The heat treatment may be carried out with a relatively slow heating rate and or cooling rate (e.g., less than 15 degrees Celsius per minute). Alternatively, not heat treatment may be carried out following the deposition of EBC 28 (44) and abradable coating 30 (48).

In the example of FIG. 4, EBC 28 may be deposited in a manner that provides for a relatively high density and/or low porosity or other void volume in the as-deposited coating. Relatively high density and/or low porosity or other void volume in the as-deposited coating may be controlled by selecting plasma gun with proper powder injection, selecting proper powder format as well as right gun power for proper coating chemistry. In the example of FIG. 4, the as-deposited EBC 28 may have a porosity or other void volume of less than about 5%, such as about 2% to about 4%. In cases in which EBC 28 and abradable coating 30 undergo a heat treatment after deposition of abradable coating 30, the density and/or void volume of EBC 28 may be substantially maintained.

While the examples of FIGS. 3 and 4 are described with regard to the heat treatments being carried out in furnace 14, in other examples, all or a portion of the heat treatments may be localized heat treatments. An isothermal heat treatment may be carried out with the component including the coating inserted in a furnace or other heated environment. A localized heat treatment may be performed with a concentrated heat source such as laser or flame torch. The type of heat treatment may be selected based upon the purpose of the heat treatment. For example, one may perform an isothermal heat treatment to stabilize the phase of the entire coating followed by a localized heat treatment on the surface. This may allow for densification only on the surface for improved oxidation and CMAS resistance without increasing the density of the entire coating, which may compromise a coating's compliance. Conversely, one may perform a localized heat treatment on the surface followed by an isothermal heat treatment to stabilize the phase of the entire coating, which may be more effective to achieve localized densification.

An example for when localized heat treatment may be desirable would be for application in which an article defines a leading edge of a blade or a vane that experiences higher temperature during operation, which may increase the severity of CMAS problem, and increased sand erosion, both of which may be mitigated by having a denser microstructure. In addition, a dense coating may be difficult to achieve in areas of a component that have a more complex geometry. In that case localized heat treatment may be used to densify/reduce the porosity or other void volume of the coating in such regions.

As described herein, examples of the disclosure may advantageously allow for relatively thick coatings (such as coating systems 24 and 34) to be formed on substrate 22, e.g., by increasing the adhesion between bond coat 26 and substrate 22, increasing the adhesion between at the interface between respective coatings/layers in coating systems 20 and 32, and/or increasing the cohesion of the respective layers. In some examples, coating system 24 may have a total thickness of greater than or equal to about 10 mils such as about 25 mils to about 40 mils. In some examples, coating system 34 may have a total thickness of greater than or equal to about 40 mils such as about 60 mils to about 80 mils. Bond coat 26 may have a thickness of at least about 1 mil such as about 2 mils to about 10 mils. EBC 28 in article 20 may have a thickness of at least about 5 mils such as about 15 mils to about 25 mils. EBC 28 in article 32 may have a thickness of at least about 1 mil such as about 5 mils to about 10 mils. Abradable coating 30 in article 32 may have a thickness of at least about 20 mils such as about 50 mils to about 80 mils.

Figure 5:
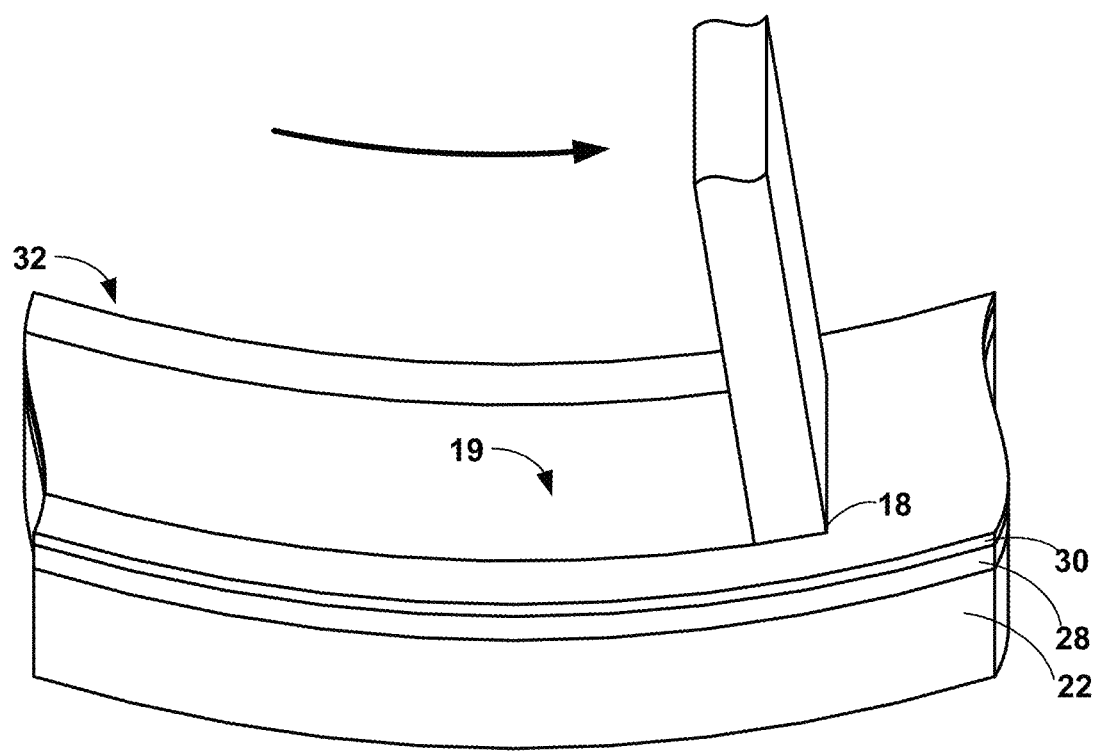
FIG. 5 is a perspective diagram illustrating an example article that includes an abradable coating and an EBC coating deposited on a substrate.

FIG. 5 illustrates a perspective diagram of an example article 32 that may be used in a high-temperature mechanical system. As described above, article 32 includes a substrate 22, EBC 28 deposited on substrate 22, and an abradable coating 30 deposited on EBC 28 and substrate 12. Bond coat 26 is not shown in FIG. 5.

Article 32 may be a component of a high-temperature mechanical system, such as, for example, a gas turbine engine or the like. In some examples, article 32 may include a gas turbine blade track or gas turbine blade shroud. However, while the description herein may be directed to a gas turbine blade track or shroud, it will be understood that the disclosure is not limited to such examples. Rather, abradable coating 30 and EBC 28 may be deposited over any article which requires or may benefit from an abradable coating and EBC. For example, abradable coating 30 and EBC 28 may be deposited on a cylinder of an internal combustion engine, an industrial pump, a housing or internal seal ring of an air compressor, or an electric power turbine.

While operating article 32 in high-temperature environments, a rotating component (e.g., blade tip 18) may abrade abradable coating 14 to cut track 19 in abradable coating 30. The thickness of abradable coating 30 may be selected such that track 19 does not penetrate all the way through abradable coating 30 into EBC 28. In the case of a turbine, as the turbine blade rotates, tip 18 of the turbine blade contacts abradable coating 30 and wears away a portion of coating 30 to form track 19 in the abradable coating corresponding to the path of the turbine blade. The intimate fit between the blade tip and abradable coating provides a seal that can reduce the clearance gap between the rotating component and an inner wall of the track or shroud, which can reduce leakage around a tip of the rotating part to enhance the power and efficiency of the gas turbine engine.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Various tests were carried out to investigate aspects of the present disclosure. Those tests are described below to illustrate examples of the present disclosure. However, examples of the disclosure are not limited by the tests and associated discussion.

Figure 8C:
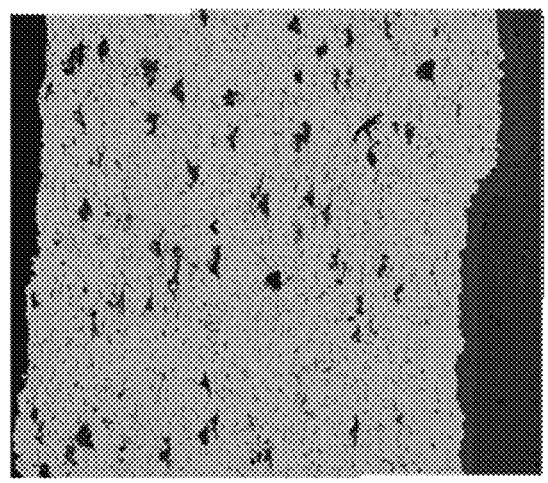
Figure 8B:
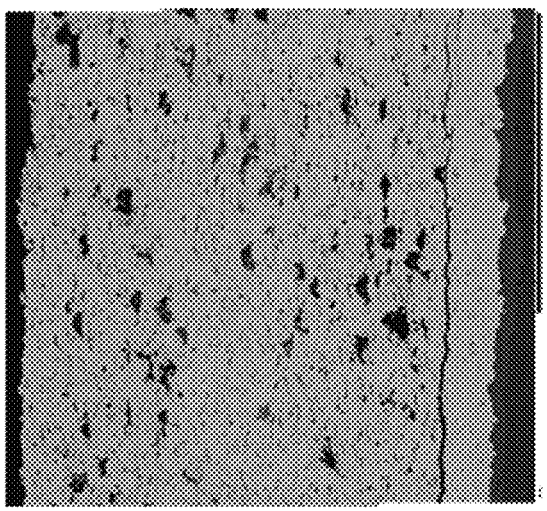
Figure 8A:
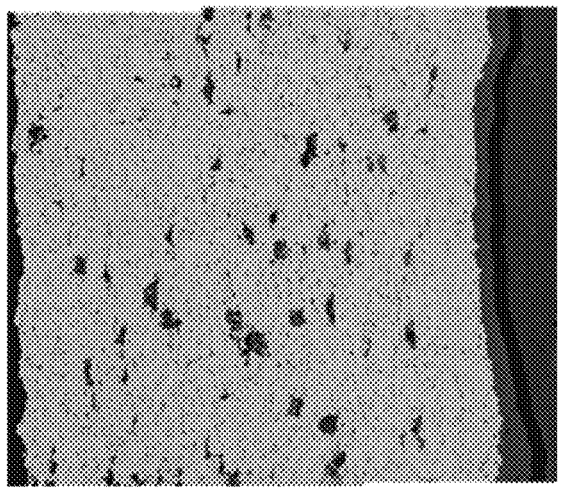

In some examples, a CMC plus EBC/abradable coating system comprises of a SiC/SiC CMC that is coated with a Si based bond coat and a multilayered RE silicate-based abradable plus non-abradable EBC (with the abradable on the non-abradable EBC). The EBC/abradable coatings may be coated to a wide range of thicknesses for various components. Thickness-associated stresses may cause the coating to detach from substrates or separate coatings between each layers if the interfacial bonding strengths are inadequate. FIGS. 8A and 8B are scanning electron microscope (SEM) images showing examples of 1) coating delamination caused by inadequate bond coat and substrate interfacial strength, and 2) coating delamination caused by inadequate interlayer interfacial strength, respectively. In the example of FIGS. 8A and 8B, the silicon bond coat had a thickness of 3 mils; the EBC had a thickness of 5 mils, and the abradable layer had a thickness of 54 mils. For the sample of FIG. 8A, there was not heat treatment of the coating. For the example of FIG. 8B, a post EBC deposition heat treatment was performed and a post abradable layer deposition was performed. Each heat treatment was for a duration of two hours at a temperature of 1200 degrees Celsius and a heating rate of 15 degrees Celsius per minute was employed.

However, it was found that the delamination may be prevented by strengthening interface(s) of such an article using one or more heat treatments, such as those described herein. FIG. 8C is an image showing coating system similar to the coating system shown in FIG. 8C. Unlike the coating systems shown in FIGS. 8A and 8B, the coating system of FIG. 8C has the same layer thicknesses but a heat treatment was carried out following the deposition of the bond coat as well as a second heat treatment following the deposition of the abradable layer. The heat treatment parameters were the same as described above for FIGS. 8A and 8B. With a heat treatment performed on the bond coat prior to the deposition of the overlaying layers, it was observed that the sample of FIG. 8C did not display coating delamination due to the strengthened substrate coating interface.

Figure 9:
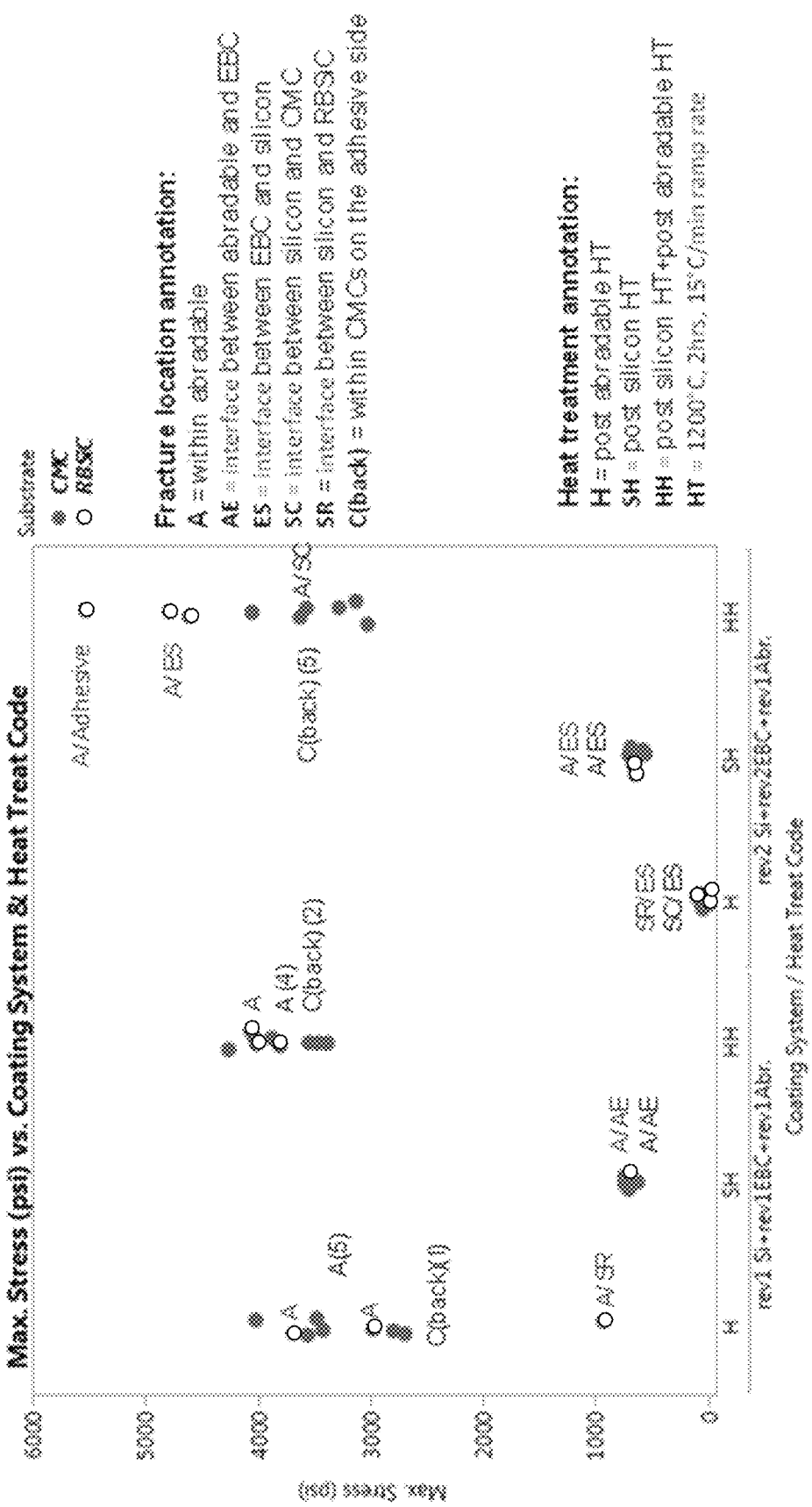

FIG. 9 is a plot showing the max stress (psi) observed for tensile tests performed on a variety of sample prepared with a variety of different heat treatment regimes, as annotated in FIG. 9, as well as two different substrate types (CMC substrate and RBSiC substrate). The bond strength was tested in accordance with ASTM C633. The substrate surfaces were not mechanically roughed prior to deposition of the coating system. The fracture location observed for the testing is indicated for each sample in FIG. 9. The tensile tests showed that with properly designed heat treatments, not only the interface between substrate and coating system, and the interfaces between each coating layers were strengthened, but also the coating's cohesive strength may be improved.

Figures 10A, 10B:
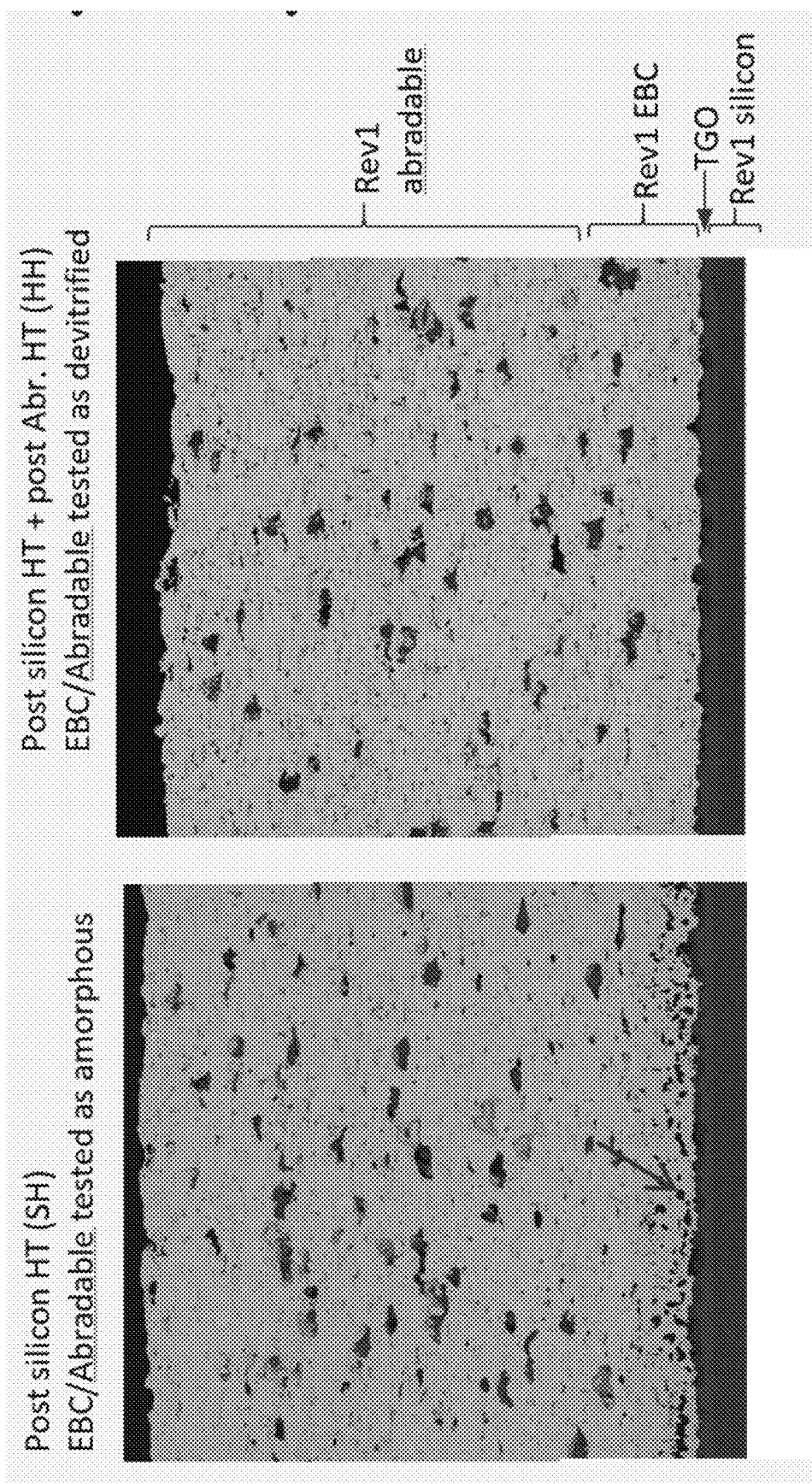

FIGS. 10A and 10B are images showing two coatings systems that underwent cyclic steam testing. The cyclic steam testing including 600 cycles at about 1315 degrees Celsius, alternating between 1 hour hot and 15 minutes of cold in a 90% H$_2$O—10% air environment. The heating rate in the hot cycle was as high as 150 degrees Celsius per minutes. Each coating system included a silicon bond coat (Rev1 silicon), an EBC (Rev1 EBC), and an abradable coating (Rev1 abradable). The bond coat of each coating system was heat treated (1200 degrees Celsius for 2 hours with a heating rate of 15° C./min) prior to deposition of the EBC and abradable coating. For the coating system of FIG. 10A, no heat treatment was performed on the EBC and abradable coating and, thus, the EBC and abradable coating were tested without first transforming at least a portion of the amorphous phase to crystalline phase material. Conversely, for the coating system of the sample of FIG. 10B, a heat treatment was performed on the EBC and abradable coating after both the EBC and abradable were deposited. The heat treatment was for a duration of two hours at a temperature of 1200 degrees Celsius and a heating rate of 15 degrees Celsius per minute was employed.

The EBC coating in the sample of FIG. 10A exhibited relatively large pores after the cyclic testing, which was not observed in the heat-treated sample of FIG. 10B. As a result, it was believed that the heat treatment sequence for the sample of FIG. 10B retained the EBC's dense microstructure, e.g., as compared to the sample of FIG. 10A. As noted above, the examples of both FIGS. 10A and 10B underwent a post silicon heat treatment which ensured the interface between silicon and RBSiC substrates was strong enough to hold the entire coating system. The difference between the examples of FIGS. 10A and 10B was that the example of FIG. 10A has no heat treatment on EBC plus abradable before plunged into a furnace heated up to 1316° C. already for cyclic steam test. Whilst for the example of FIG. 10B the EBC plus abradable was heat treated before plunged into the furnace. The coatings were heated up in a fast heating rate (about 150° C./min) when plunged into a furnace, which may quickly turn an amorphous coating (if not heat treated) to viscoelastic status before the onset of crystallization. This may reduce the strength of the coating make it subject to deformation and/or being torn apart. It is believed that this was why the EBC in the example of FIG. 10A showed a sponge look microstructure after the testing while EBC in the example of FIG. 10B showed an intact hermetic microstructure.

Figures 11A, 11B:
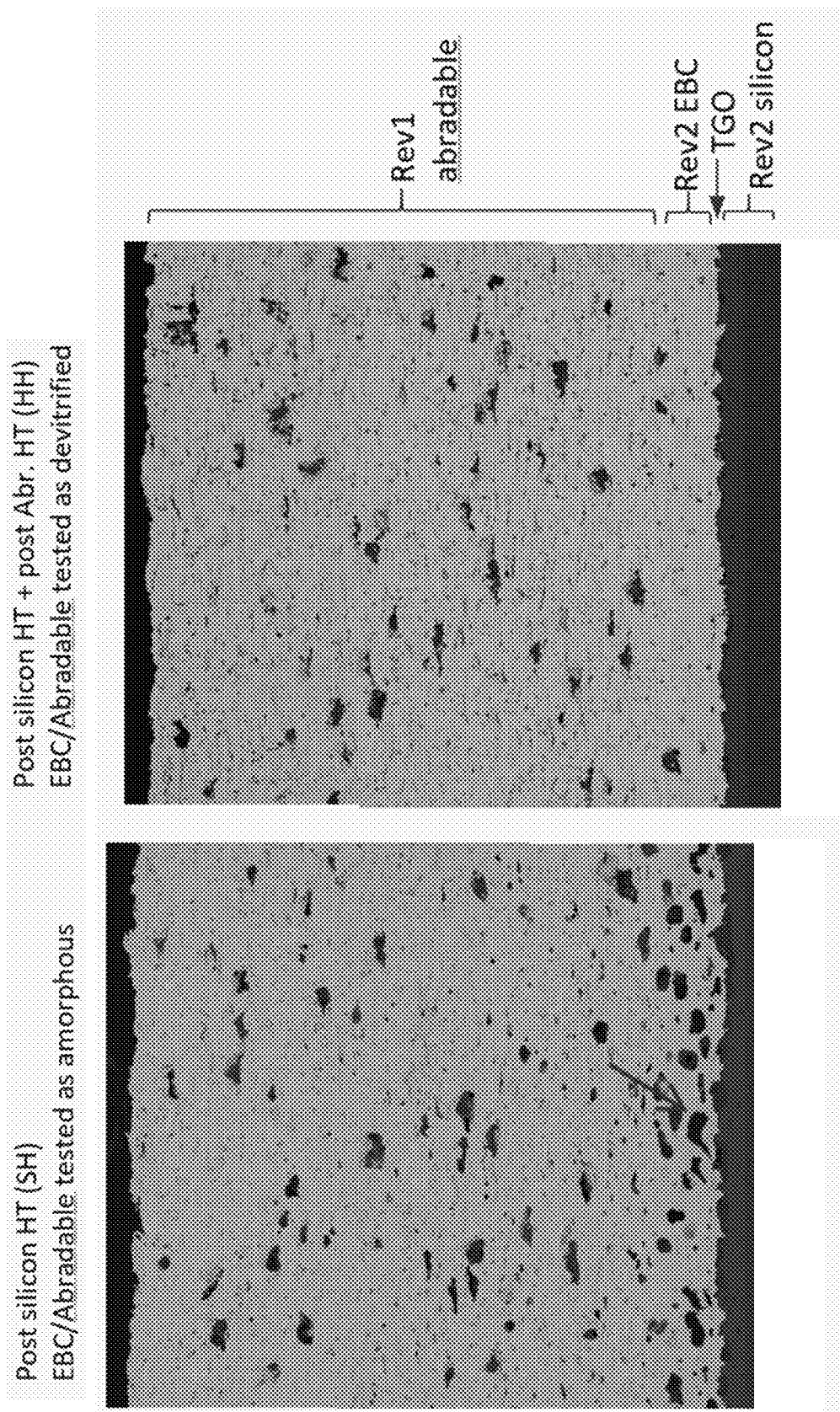
Figure 14A:
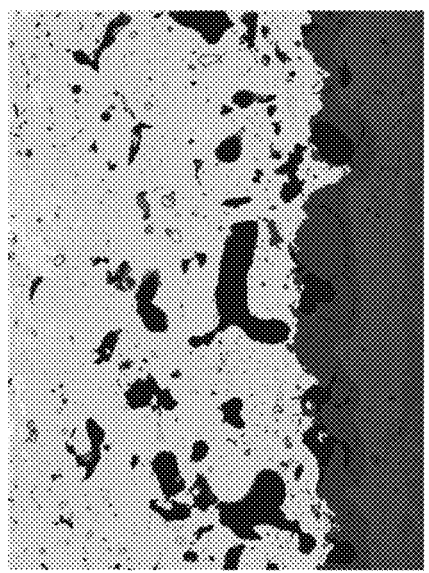
Figure 14B:
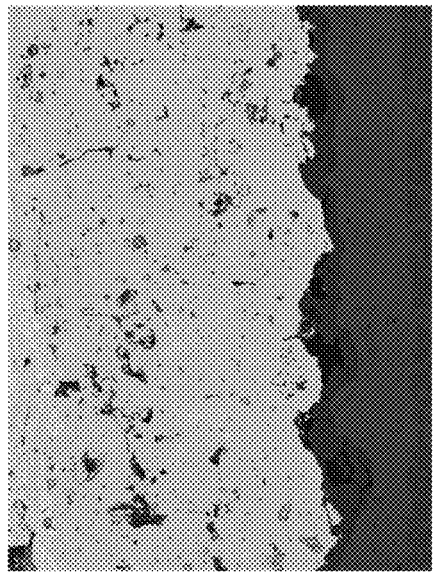
Figure 15A:
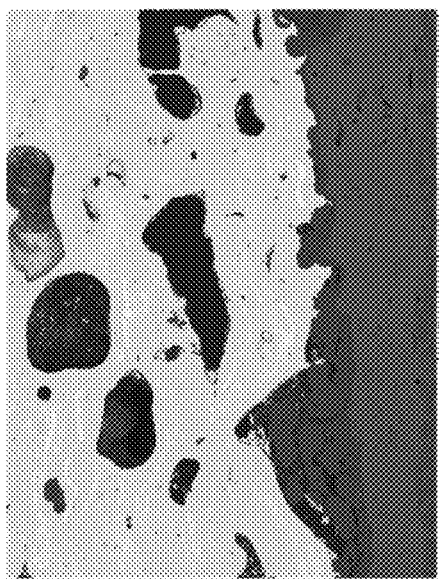
Figure 15B:
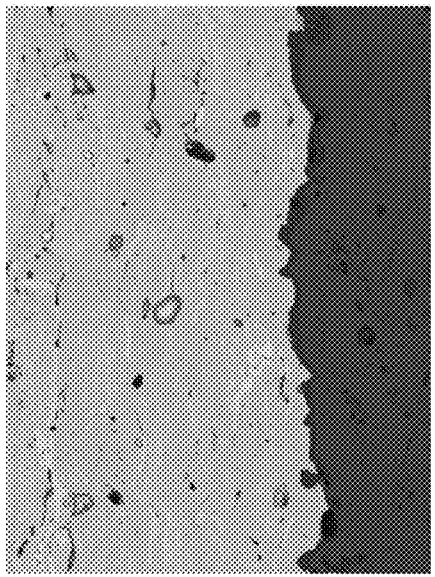

FIGS. 11A and 11B are images showing two coatings systems that underwent cyclic steam testing similar to the samples of FIGS. 10A and 10B. Each coating system included a silicon bond coat (Rev2 silicon), an EBC (Rev2 EBC), and an abradable coating (Rev1 abradable). The bond coat of each coating system was heat treated prior to deposition of the EBC and abradable coating. The heat treatment was for a duration of two hours at a temperature of 1200 degrees Celsius and a heating rate of 15 degrees Celsius per minute was employed. For the coating system of FIG. 10A, no heat treatment was performed on the EBC and abradable coating and, thus, the EBC and abradable coating were tested without first transforming at least a portion of the amorphous phase to crystalline phase material. Conversely, for the coating system of the sample of FIG. 10B, a heat treatment was performed on the EBC and abradable coating after both the EBC and abradable were deposited. In the samples of FIGS. 11A and 11B, the as-deposited EBC (Rev2 EBC) was denser/less porous than the EBC (Rev1 EBC) of the samples of FIGS. 10A and 10B. After the heat treatment, rev1 EBC had a 5.7% porosity and 3.9 wt % YbMS; the rev2 EBC had a 1.5% porosity and 10.8 wt % YbMS.

In the samples of FIGS. 11A and 11B, the bond coating (Rev2 silicon) was different than the bond coat (Rev1 silicon) of the samples of FIGS. 10A and 10B. Both bond coats were sprayed with the same silicon powder. The difference was that Rev1 was thermally sprayed with Metco F4 MB gun and Rev2 was thermally sprayed with Praxair's SG-100 gun.

Observations similar to that described for the examples of FIGS. 10A and 10B were observed for the examples of FIGS. 11A and 11B. The TGO observed in rev2 si/EBC was almost 4-fold thinner than the rev1si/EBC sample (see results in FIG. 16—compare HH condition which had both sponge looking EBCs). The EBC coating in the sample of FIG. 11A exhibited relatively large pores after the cyclic testing, which was not observed in the heat-treated sample of FIG. 11B.

FIGS. 12A and 12B are images showing magnified views of the samples of FIGS. 10A and 10B, respectively. FIGS. 13A and 13B are images showing magnified view of the samples of FIGS. 11A and 11B, respectively. It was observed that 1) without proper HT sequence, a sponge looking EBC may result no matter what EBC revision the system includes, and 2) with proper HT sequence, a system including the rev2 EBC may grow thinner TGO in cyclic steam test, e.g., because rev2 had a more hermetic microstructure than rev1 EBC. FIGS. 14A-15B are images showing magnified view of the examples of FIGS. 12A-13B, respectively, to better show the TGO for each sample.

Figure 16:
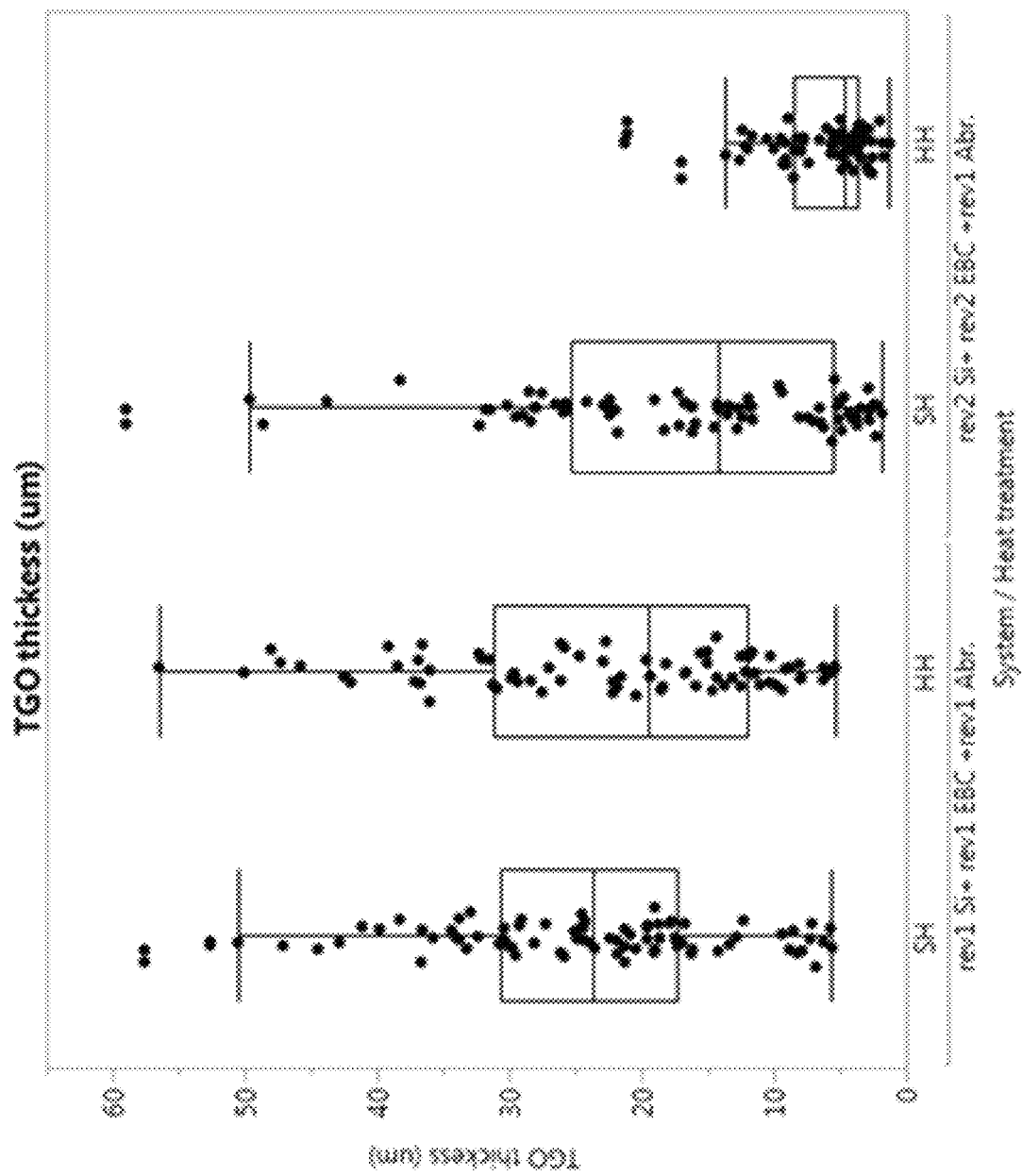

FIG. 16 is a plot of the TGO thickness observed for a variety of sample including various coating systems deposited on a RBSiC substrate. The samples on the far left (SH rev1 silicon+rev1 EBC+rev1 Abr.) had a coating system substantially the same as that described for the FIG. 14A sample and underwent the same heat treatment regime (heat treatment of only the as-deposited bond coat). The samples second from the left (HH rev1 silicon+rev1 EBC+rev1 Abr.) had a coating system substantially the same as that described for the FIG. 14B sample and underwent the same heat treatment regime (heat treatment of the as-deposited bond coat and heat treatment after the abradable deposition). The samples second from the right (SH rev2 silicon+rev2 EBC+rev1 Abr.) had a coating system substantially the same as that described for the FIG. 15A sample and underwent the same heat treatment regime (heat treatment of only the as-deposited bond coat). The samples on the far right (HH rev2 silicon+rev2 EBC+rev1 Abr.) had a coating system substantially the same as that described for the FIG. 15B sample and underwent the same heat treatment regime (heat treatment of the as-deposited bond coat and heat treatment after the abradable deposition).

As shown in FIG. 16, under the described testing condition, an approximately four-fold reduction of TGO thickness was observed by using the denser EBC (rev2 EBC compared to rev1 EBC).

Figure 17:
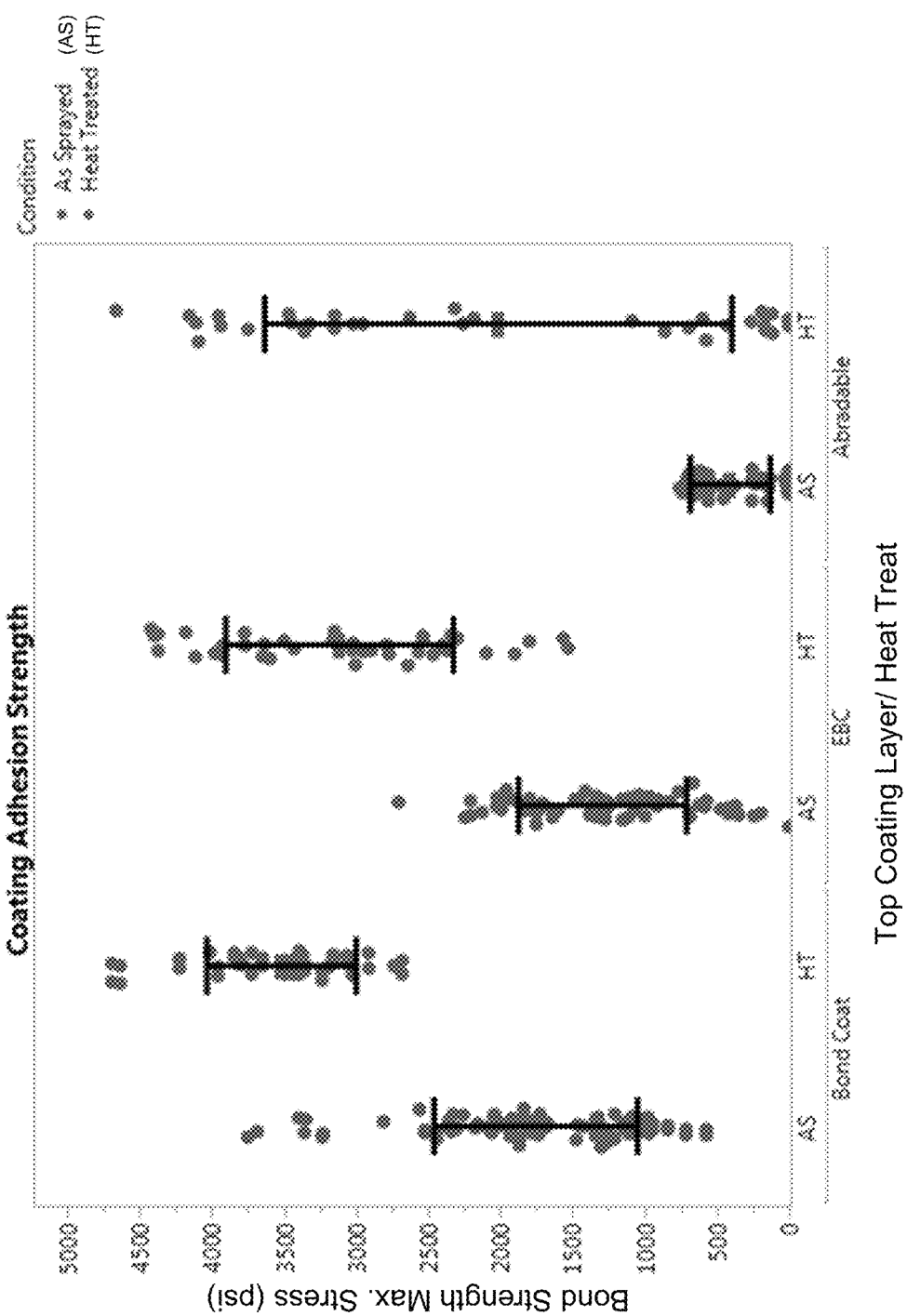

FIG. 17 is a plot showing the observed bond strength for various as-deposited (as sprayed (AS)) and heat treated (HT) bond coats, EBCs and abradable coatings. The plot illustrates the increased adhesion of the layers as a result of heat treatments.

While investigation the sample coatings, coating densification was observed when EBCs exposed to high temperature with a relatively high heat rate. Two possible densification mechanisms are as follows: 1) the heating rate is fast enough that the coating becomes viscoelastic and has sufficient time to flow before the onset of crystallization, thereby closing open porosity and healing cracks; and/or 2) the fast heating rate delays the onset of crystallization thereby allowing the coating sufficient time to become viscoelastic and flow. It is possible to change crystallization kinetics of a glass by increasing the heating rate.

With the samples described above, under fast heating when inner layer EBC was sandwiched between the substrate and outer layer (abradable coating), the viscoelastic flow was refrained, and the stresses induced by outer layers may stretch the coatings and form a sponge looking microstructure such as that shown in FIG. 10A.

Various examples have been described. These and other examples are within the scope of the following clauses and claims.

Clause 1. A method comprising: depositing a bond coat on a ceramic or ceramic matrix composite (CMC) substrate to form an as-deposited bond coat; heat treating the as-deposited bond coat following the deposition of the as-deposited bond coat on the substrate to form a heat treated bond coat; depositing an environment barrier coating (EBC) layer on the heat treated bond coat to form as deposited EBC layer; and heat treating the as-deposited EBC layer to form a heat treated EBC layer.

Clause 2. The method of clause 1, wherein heat treating the as-deposited bond coat comprises heat treating the as-deposited bond coat to increase adhesion of the bond coat to the ceramic or the CMC substrate as compared to the as-deposited bond coat.

Clause 3. The method of clause 2, wherein heat treating the as-deposited bond coat to increase adhesion of the bond coat to the ceramic or the CMC substrate comprises heating the as-deposited bond coat at a first controlled rate, wherein the controlled rate is selected to increase the adhesion of the bond coat to the ceramic or the CMC substrate as compared to the as-deposited bond coat.

Clause 4. The method of clause 3, wherein the controlled rate is about 0.5 degrees Celsius per minute (° C./min) to about 30° C./min.

Clause 5. The method of any one of clauses 1-4, further comprising, prior to heat treating the as-deposited EBC layer, depositing an abradable layer on the EBC layer to form an as-deposited abradable layer, wherein heat treating the as-deposited EBC layer comprises heat treating a combination of the as-deposited EBC layer and the as-deposited abradable layer to form the heat treated EBC layer and a heat treated abradable layer.

Clause 6. The method of clause 5, wherein the heat treatment of the combination of the as-deposited EBC layer and the as-deposited abradable layer is configured to transform at least a portion of amorphous phase material in the as-deposited EBC layer and the as-deposited abradable layer into crystalline phase while substantially maintaining a microstructure of the as-deposited EBC layer and the as-deposited abradable layer.

Clause 7. The method of clause 5, wherein heat treating the combination of the as-deposited EBC layer and the as-deposited abradable layer comprises heating the combination of the as-deposited EBC layer and the as-deposited abradable layer at a rate of about 0.5 degrees Celsius/minute to about 30 degrees Celsius/minute to a temperature between about 500 degrees Celsius and about 1500 degree Celsius.

Clause 8. The method of any one of clauses 1-7, wherein heat treating the as-deposited EBC layer to form a heat treated EBC layer comprises heat treating the as-deposited EBC layer to decrease a porosity of the heat treated EBC layer as compared to the as-deposited EBC layer.

Clause 9. The method of clause 8, wherein heat treating the as-deposited EBC layer to decrease a porosity of the heat treated EBC layer as compared to the as-deposited EBC layer comprises heating the as-deposited EBC layer at a first controlled rate, wherein the controlled rate is selected to decrease the porosity of the heat treated EBC layer as compared to the as-deposited EBC layer.

Clause 10. The method of clause 9, further comprising: depositing, following the heat treatment of the as-deposited EBC layer, an abradable layer on the heat treated EBC layer to form an as-deposited abradable coating; and heat treating the as-deposited abradable coating to form a heat treated abradable coating.

Clause 11. The method of clause 10, wherein heat treating the as-deposited abradable layer includes heating the as-deposited abradable layer at a second controlled rate that is less than the first controlled rate.

Clause 12. The method of clause 11, wherein the first controlled rate is greater than about 15 degrees Celsius per minute.

Clause 13. The method of clause 11, wherein the second controlled rate is less than 30 degrees Celsius per minute.

Clause 14. The method of any one of clauses 1-13, wherein the EBC layer includes at least one of rare earth (RE) monosilicate or RE disilicate.

Clause 15. The method of any one of clauses 1-14, wherein depositing the EBC layer on the substrate to form the as-deposited EBC layer comprises depositing the EBC on the substrate via at least one of thermal spray deposition or slurry deposition.

Clause 16. The method of any one of clauses 1-15, wherein the heat treated EBC layer is a substantially hermetic EBC layer.

Clause 17. The method of any one of clauses 1-16, further comprising, prior to depositing the bond coat, depositing an intermediate layer on the substrate, wherein the intermediate layer forms a diffusion barrier between the substrate and the bond coat to reduce diffusion of impurities from the substrate into the bond coat.

Clause 18. The method of any one of clauses 1-17, further comprising, prior to depositing the EBC layer, depositing an intermediate layer on the bond coat, wherein the intermediate layer forms a oxygen diffusion barrier to reduce oxidation of the bond coat.

Clause 19. A system comprising: a deposition device; a heat treatment device; and a controller device configured to control the deposition device to deposit a bond coat on a ceramic or ceramic matrix composite (CMC) substrate to form an as-deposited bond coat, control the heat treatment device to heat treat the as-deposited bond coat following the deposition of the as-deposited bond coat on the substrate to form a heat treated bond coat, control the deposition device to subsequently deposit an environmental barrier coating (EBC) on the heat treated bond coat to form an as-deposited EBC, and control the heat treatment device to heat treat the as-deposited EBC form a heat treated EBC.

Clause 20. The system of clause 19, wherein the system is configured to perform a method according to any one of clauses 1-18.

The invention claimed is:

1. A method comprising:
   depositing a bond coat on a ceramic or ceramic matrix composite (CMC) substrate to form an as-deposited bond coat;
   heat treating the as-deposited bond coat following the deposition of the as-deposited bond coat on the substrate to form a heat treated bond coat;
   depositing an environment barrier coating (EBC) layer on the heat treated bond coat to form as deposited EBC layer; and
   heat treating the as-deposited EBC layer to form a heat treated EBC layer,
   wherein heat treating the as-deposited bond coat comprises heating the as-deposited bond coat at a controlled rate to increase adhesion of the bond coat to the ceramic or the CMC substrate as compared to the as-deposited bond coat,
   wherein the controlled rate is 0.5 degrees Celsius per minute (° C./min) to 30° C./min.

2. The method of claim 1, further comprising, prior to heat treating the as-deposited EBC layer, depositing an abradable layer on the EBC layer to form an as-deposited abradable layer, wherein heat treating the as-deposited EBC layer comprises heat treating a combination of the as-deposited EBC layer and the as-deposited abradable layer to form the heat treated EBC layer and a heat treated abradable layer.

3. The method of claim 2, wherein the heat treatment of the combination of the as-deposited EBC layer and the as-deposited abradable layer is configured to transform at least a portion of amorphous phase material in the as-deposited EBC layer and the as-deposited abradable layer into crystalline phase while substantially maintaining a microstructure of the as-deposited EBC layer and the as-deposited abradable layer.

4. The method of claim 2, wherein heat treating the combination of the as-deposited EBC layer and the as-deposited abradable layer comprises heating the combination of the as-deposited EBC layer and the as-deposited abradable layer at a rate of about 0.5 degrees Celsius/minute to about 30 degrees Celsius/minute to a temperature between about 500 degrees Celsius and about 1500 degree Celsius.

5. The method of claim 1, wherein heat treating the as-deposited EBC layer to form a heat treated EBC layer comprises heat treating the as-deposited EBC layer to decrease a porosity of the heat treated EBC layer as compared to the as-deposited EBC layer.

6. The method of claim 5, wherein heat treating the as-deposited EBC layer to decrease a porosity of the heat treated EBC layer as compared to the as-deposited EBC layer comprises heating the as-deposited EBC layer at a first controlled rate, wherein the controlled rate is selected to decrease the porosity of the heat treated EBC layer as compared to the as-deposited EBC layer.

7. The method of claim 6, further comprising:
   depositing, following the heat treatment of the as-deposited EBC layer, an abradable layer on the heat treated EBC layer to form an as-deposited abradable coating; and
   heat treating the as-deposited abradable coating to form a heat treated abradable coating.

8. The method of claim 7, wherein heat treating the as-deposited abradable layer includes heating the as-deposited abradable layer at a second controlled rate that is less than the first controlled rate.

9. The method of claim 8, wherein the first controlled rate is greater than about 15 degrees Celsius per minute.

10. The method of claim 8, wherein the second controlled rate is less than 30 degrees Celsius per minute.

11. The method of claim 1, wherein the EBC layer includes at least one of rare earth (RE) monosilicate or RE disilicate.

12. The method of claim 1, wherein depositing the EBC layer on the substrate to form the as-deposited EBC layer comprises depositing the EBC on the substrate via at least one of thermal spray deposition or slurry deposition.

13. The method of claim 1, wherein the heat treated EBC layer is a substantially hermetic EBC layer.

14. The method of claim 1, further comprising, prior to depositing the bond coat, depositing an intermediate layer on the substrate, wherein the intermediate layer forms a diffusion barrier between the substrate and the bond coat to reduce diffusion of impurities from the substrate into the bond coat.

15. The method of claim 1, further comprising, prior to depositing the EBC layer, depositing an intermediate layer on the bond coat, wherein the intermediate layer forms a oxygen diffusion barrier to reduce oxidation of the bond coat.

16. The method of claim 1, wherein the heat treated bond coat has a thickness of about 2 mils to about 10 mils.

17. The method of claim 1, wherein the controlled rate is a first controlled rate,
 wherein heat treating the as-deposited EBC layer to form a heat treated EBC layer comprises heating the as-deposited EBC layer at a second controlled rate, and
 wherein the second controlled rate is 100 degrees Celsius per minute (° C./min) to 300° C./min.

18. The method of claim 1, wherein heat treating the as-deposited bond coat comprises a localized heat treatment.

\* \* \* \* \*